US012366710B2

(12) United States Patent
Logunov et al.

(10) Patent No.: US 12,366,710 B2
(45) Date of Patent: Jul. 22, 2025

(54) FIBER OPTIC FERRULE AND INTERFACE FOR COUPLING HOLLOW-CORE AND SOLID-CORE OPTICAL FIBERS

(71) Applicant: CORNING RESEARCH & DEVELOPMENT CORPORATION, Corning, NY (US)

(72) Inventors: Stephan Lvovich Logunov, Corning, NY (US); Pushkar Tandon, Painted Post, NY (US); Qi Wu, Painted Post, NY (US)

(73) Assignee: Corning Research & Development Corporation, Corning, NY (US)

( * ) Notice: Subject to any disclaimer, the term of this patent is extended or adjusted under 35 U.S.C. 154(b) by 232 days.

(21) Appl. No.: 17/988,924

(22) Filed: Nov. 17, 2022

(65) Prior Publication Data
US 2023/0168436 A1    Jun. 1, 2023

Related U.S. Application Data

(60) Provisional application No. 63/283,616, filed on Nov. 29, 2021.

(51) Int. Cl.
*G02B 6/38*    (2006.01)

(52) U.S. Cl.
CPC ......... *G02B 6/3822* (2013.01); *G02B 6/3826* (2013.01); *G02B 6/3845* (2013.01); *G02B 6/3885* (2013.01)

(58) Field of Classification Search
CPC .. G02B 6/3822; G02B 6/3826; G02B 6/3845; G02B 6/3885
See application file for complete search history.

(56) References Cited

U.S. PATENT DOCUMENTS

| 9,366,830 B2 * | 6/2016 | Levin | G02B 6/3818 |
| 10,345,533 B1 | 7/2019 | Logunov et al. | |
| 10,422,961 B2 | 9/2019 | Logunov et al. | |
| 10,429,589 B2 * | 10/2019 | Bookbinder | G02B 6/305 |
| 10,545,293 B2 | 1/2020 | Logunov et al. | |
| 10,746,937 B2 | 8/2020 | Butler et al. | |

(Continued)

OTHER PUBLICATIONS

Parmar et al., "Optimized butt coupling between single mode fiber and hollow-core photonic crystal fiber", Opt. Fiber Tech., vol. 19, Issue 5, Oct. 2013, pp. 490-494 (Year: 2013).*

(Continued)

*Primary Examiner* — Daniel Petkovsek

(57) ABSTRACT

A fiber coupling assembly for interfacing solid core and a hollow core optical fibers includes first and second fiber optic ferrules each having a bore between proximal and distal end faces thereof. At least one ferrule end face is non-perpendicular to longitudinal axes of the ferrules. A bore of one ferrule contains a hollow core optical fiber, and a bore of the other optic ferrule contains a solid core optical fiber with a mode field diameter (MFD) transition region, to bridge a MFD mismatch between the fibers. An air gap may be provided between at least portions of ferrules at an inter-ferrule region. A fiber optic ferrule includes a bore that is non-parallel with a longitudinal axis of the ferrule, and at least one end face that is non-perpendicular to the longitudinal axis, with an optical fiber in the bore optionally including a MFD transition region.

12 Claims, 15 Drawing Sheets

(56) References Cited

U.S. PATENT DOCUMENTS

| | | | |
|---|---|---|---|
| 10,845,268 B1 | 11/2020 | O'Sullivan | |
| 12,047,117 B2* | 7/2024 | He | H04B 10/07955 |
| 2011/0026884 A1* | 2/2011 | Hikosaka | G02B 6/3847 |
| | | | 385/72 |
| 2012/0201494 A1* | 8/2012 | Suzuki | G02B 6/3508 |
| | | | 385/16 |
| 2019/0041586 A1* | 2/2019 | Hosokawa | G02B 6/3839 |
| 2023/0014659 A1* | 1/2023 | Corrado | G02B 6/2551 |

OTHER PUBLICATIONS

Huang et al., "Low-loss coupling from single-mode solid-core fibers to anti-resonant hollow-core fibers by fiber tapering technique," Opt. Express 27, pp. 37111-37121 (Year: 2019).*

"D. Marcuse.; Loss Analysis of Single-Mode Fiber splices", Bell System Technical Journal, 56(5), pp. 703-718, (1977).

Khan et al; "Design and characterization of coherent integrated fiber-optic imagaing probes"; Applied Optics 33, vol. 33, pp. 5875-5881, (1994).

Kim, et al., "Free Space based Hollow Core Fiber Interconnection and Associated In-Line Components", Optical Fiber Communications Conference and Exhibition 2019, pp. 1-3.

Shimakawa et al; "Single-mode multi-optical-fiber lensed connector enabling dust insensitive and low mating force"; SEI Technical Review, No. 81, 2015, pp. 27-30.

* cited by examiner

FIBER OPTIC FERRULE AND INTERFACE FOR COUPLING HOLLOW-CORE AND SOLID-CORE OPTICAL FIBERS

PRIORITY APPLICATION

This application claims the benefit of priority of U.S. Provisional Application No. 63/283,616, filed on Nov. 29, 2021, the content of which is relied upon and incorporated herein by reference in its entirety.

BACKGROUND

This disclosure relates generally to optical fibers, and more particularly to ferrules and coupling interfaces for coupling solid-core optical fibers and hollow-core optical fibers.

Optical fibers are useful in a wide variety of applications, including the telecommunications industry for voice, video, and data transmissions. Traditional optical fibers consist of a solid material (such as glass or a polymer) through which light is guided. Such fibers may be referred to a solid core (SC) optical fibers, including both single-mode and multi-mode varieties. Single-mode optical fibers are characterized by smaller core size than multi-mode fibers (e.g., 9 µm vs. 50 µm), leading to lower attenuation, thereby enabling longer transmission distances and higher bandwidths. Primary sources of propagation losses in a SC optical fiber are scattering and absorption due to interaction between light and the solid material of the waveguide. More recently, various types of hollow core (HC) optical fibers have been developed, wherein HC optical fibers present the potential for improved performance due to lower absorption, reduced non-linearities, and higher power handling capability. Light travels faster in air or vacuum than in glass, so HC optical fibers may also enhance signal transmission speed in telecommunications applications. Various types of HC optical fibers exist. One type includes HC photonic bandgap fibers (HC-PBGFs), in which light is guided in a hollow core that is surrounded by a micro-structured cladding comprising an arrangement of air holes separated by glass membranes. Another type includes HC anti-resonant optical fibers (HC-ARFs), in which an optical signal propagates in an air core surrounded by a ring of anti-resonant tube elements. HC optical fibers typically have a larger core size (e.g., around 30 µm) than single-mode SC optical fibers.

A majority of optical fibers currently in commercial use are SC optical fibers. Challenges associated with providing inexpensive and low-loss interfaces between SC optical fibers and HC optical fibers have limited the implementation of HC optical fibers. In addition to core size and mode field diameter mismatch between SC and HC optical fibers, these different types of optical fibers also include central portions with different refractive index values, and significant Fresnel reflection losses would also result. Simple butt coupling between SC and FTC optical fibers using mechanical connectors would lead to significant insertion losses and back reflection losses.

The art continues to seek interfaces between SC optical fibers and HC optical fibers that address limitations associated with conventional implementations.

SUMMARY

Aspects of the present disclosure provide a fiber coupling assembly and a fiber optic ferrule that facilitate interfacing between a solid core optical fiber and a hollow core optical fiber. A fiber optic coupling assembly comprises first and second fiber optic ferrules each having a longitudinal axis and each defining a bore between proximal and distal end faces thereof. At least portions of the end faces contact one another, and at least one of the first or second proximal end faces is non-perpendicular to the longitudinal axes of the fiber optic ferrules. A bore of the second fiber optic ferrule contains a hollow core optical fiber, while a bore of the first fiber optic ferrule contains a solid core optical fiber and a mode field diameter transition region that provides a transition between mode field diameter values of the of solid core optical fiber that are different at the first proximal and first distal end faces, respectively, of the first fiber optic ferrule. The mode field diameter transition region bridges a mode field diameter mismatch between a conventional solid core optical fiber (e.g., a single mode optical fiber) and a hollow core optical fiber (e.g., a hollow core anti-resonant optical fiber). Separately, or additionally, a fiber optic ferrule comprises a body structure defining a bore that extends from a first end face to a second end face of the body structure, whether at least one end face is non-perpendicular to the bore, and the bore is non-parallel with a longitudinal axis of the body structure. Such arrangement permits a beam refracted at the first end face, corresponding to an interface between a solid core optical fiber and a hollow core optical fiber, to be propagated through an optical fiber (i.e., either a solid sore optical fiber or a hollow core optical fiber) in the bore in a direction aligned with a core thereof.

In an exemplary aspect, the disclosure relates to a fiber optic coupling assembly for interfacing a solid core optical fiber and a hollow core optical fiber. The fiber optic coupling assembly comprise: a first fiber optic ferrule comprising a first body structure having a first longitudinal axis, a first proximal end face, and a first distal end face, the first body structure defining a first bore extending from the first proximal end face to the first distal end face; and a second fiber optic ferrule comprising a first body structure having a second longitudinal axis, a second proximal end face, and a second distal end face, the second body structure defining a second bore extending from the second proximal end face to the second distal end face. The second longitudinal axis is coaxial with the first longitudinal axis. At least a portion of the first proximal end face is in contact with at least a portion of the second proximal end face. At least one of the first proximal end face or the second proximal end face is non-perpendicular to each of the first longitudinal axis and the second longitudinal axis. The first bore contains a solid core optical fiber having a first mode field diameter at the first proximal end face, having a second mode field diameter at the first distal end face, and having a mode field diameter transition region arranged between the first proximal end face and the first distal end face, the mode field diameter transition region providing a mode field diameter that transitions from the first mode field diameter to the second mode field diameter. The second bore contains a hollow core optical fiber.

In certain embodiments, the first proximal end face is non-parallel to the second proximal end face, and an air gap is provided between a portion of the first proximal end face and a portion of the second proximal end face.

In certain embodiments, the first proximal end face is parallel to the second proximal end face.

In certain embodiments, an antireflection coating is provided at the first proximal end face.

In certain embodiments, the first mode field diameter exceeds the second mode field diameter by at least 10 µm.

In certain embodiments, the first body structure has a generally cylindrical shape, and the second body structure has a generally cylindrical shape.

In certain embodiments, the first body structure comprises a frustoconical portion proximate to the first proximal end face, and the second body structure comprises a frustoconical portion proximate to the second proximal end face.

In certain embodiments, one of the first bore or the second bore is non-parallel with the first and second longitudinal axes, while the other of the first bore or the second bore is parallel with the first and second longitudinal axes.

In certain embodiments, for the one of the first bore or the second bore that is non-parallel with the first and second longitudinal axes, an angular mismatch between the bore and the first and second longitudinal axes is in a range of 1.0 degrees to 1.5 degrees.

In certain embodiments, a center of the first bore is coincident with the first longitudinal axis at the first proximal end face, and a center of the second bore is coincident with the second longitudinal axis at the second proximal end face.

In certain embodiments, a proximal end of the hollow core optical fiber is non-parallel with the second proximal end face, such an inset region is provided between the second proximal end face and the proximal end of the hollow core optical fiber, and an air gap is provided between a portion of the proximal end of the hollow core optical fiber and portion of a proximal end of the solid core optical fiber.

In certain embodiments, the first fiber optic ferrule comprises a plurality of first bores extending from the first proximal end face to the first distal end face; the second fiber optic ferrule comprises a plurality of second bores extending from the second proximal end face to the second distal end face; each first bore of the plurality of first bores contains a solid core optical fiber having a first mode field diameter at the first proximal end face, having a second mode field diameter at the first distal end face, and having a mode field diameter transition region arranged between the first proximal end face and the first distal end face, the mode field diameter transition region providing a mode field diameter that transitions from the first mode field diameter to the second mode field diameter; and each second bore of the plurality of second bores contains a hollow core optical fiber.

In certain embodiments, the fiber optic coupling assembly comprises a first connector that includes the first fiber optic ferrule, and comprises a second connector that includes the second fiber optic ferrule.

In another aspect, the disclosure relates to a fiber optic ferrule comprises a body structure having a longitudinal axis, a first end face, and a second end face, wherein: the body structure defines a bore extending from the first end face to the second end face; at least one of the first end face or second end face is non-perpendicular to the bore; and the bore is non-parallel with the longitudinal axis.

In certain embodiments, a center of the bore is coincident with the longitudinal axis at the first end face.

In certain embodiments, the body structure comprises a generally cylindrical shape.

In certain embodiments, the body structure comprises a frustoconical portion proximate to the first end face.

In certain embodiments, the second end face is non-parallel to the first end face.

In certain embodiments, the ferrule further comprises a solid core optical fiber within the bore, wherein the optical fiber comprises: a first mode field diameter at the first end face; a second mode field diameter at the second end face, the first mode field diameter being greater than the second mode field diameter; and a mode field diameter transition region arranged between the first end face and the second end face, the mode field diameter transition region providing a mode field diameter that transitions from the first mode field diameter to the second mode field diameter.

In certain embodiments, the first mode field diameter exceeds the second mode field diameter by at least 10 μm.

In certain embodiments, the fiber optic ferrule further comprises an antireflection coating at the first end face.

In certain embodiments, the fiber optic ferrule further comprises a hollow core optical fiber within the bore.

In certain embodiments, the bore is a first bore; the fiber optic ferrule further comprises a second bore extending from the first end face to the second end face; and the second bore is substantially parallel with the first bore.

In certain embodiments, a fiber optic coupling assembly includes at least one connector comprising a fiber optic ferrule as disclosed herein.

Additional features and advantages will be set forth in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Various embodiments will be further clarified by examples in the description below. In general, the description relates to a fiber coupling assembly and a fiber optic ferrule that facilitate interfacing between a solid core optical fiber and a hollow core optical fiber.

Before discussing fiber optic coupling assemblies and ferrules according to the present disclosure, conventional optical fibers of solid core and hollow core varieties, and conventional fiber optic connectors will be introduced.

Figure 1:
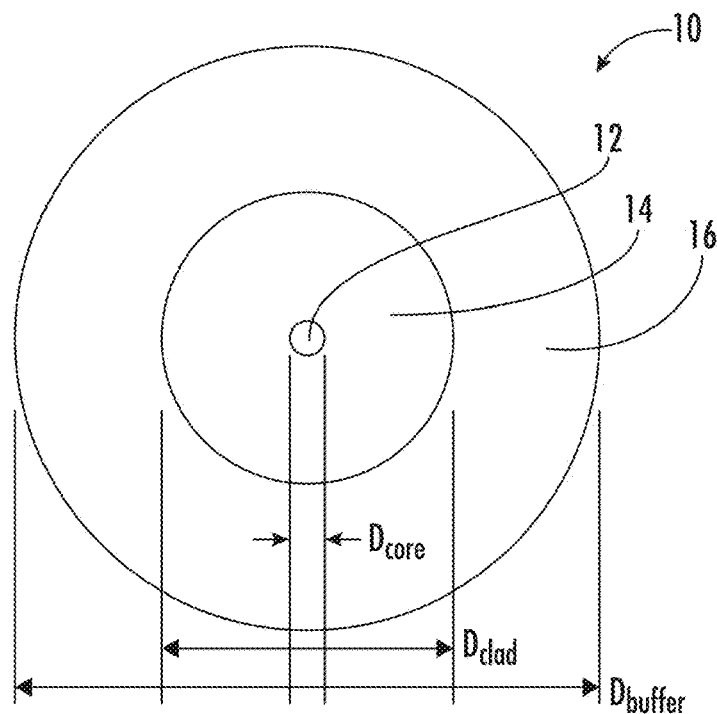
FIG. 1 is a cross-sectional view of a solid core single-mode optical fiber.

FIG. 1 is a cross-sectional view of a conventional single-mode optical fiber having a solid core 12 surrounded by cladding 14 that is surrounded by a buffer 16, each arranged in an elongated cylindrical shape. The cladding 14 may be formed of pure silica, and the core 12 may be formed of doped silica, although dopants may be present in each of these layers, and materials other than silica may be used. A refractive index of the core 12 is greater than that of the cladding 14. Typically, the core diameter ($D_{core}$) is in a range of 8-10 µm, the cladding diameter ($D_{clad}$) is 125 µm, and the buffer diameter ($D_{buffer}$) is 250 µm. For a single-mode optical fiber 10 having a $D_{core}$ of 8.2 µm and a numerical aperture of 0.14, the mode field diameter (MFD) is typically about 9.2 µm at 1310 nm, or 10.4 µm at 1550 nm.

Figure 2:
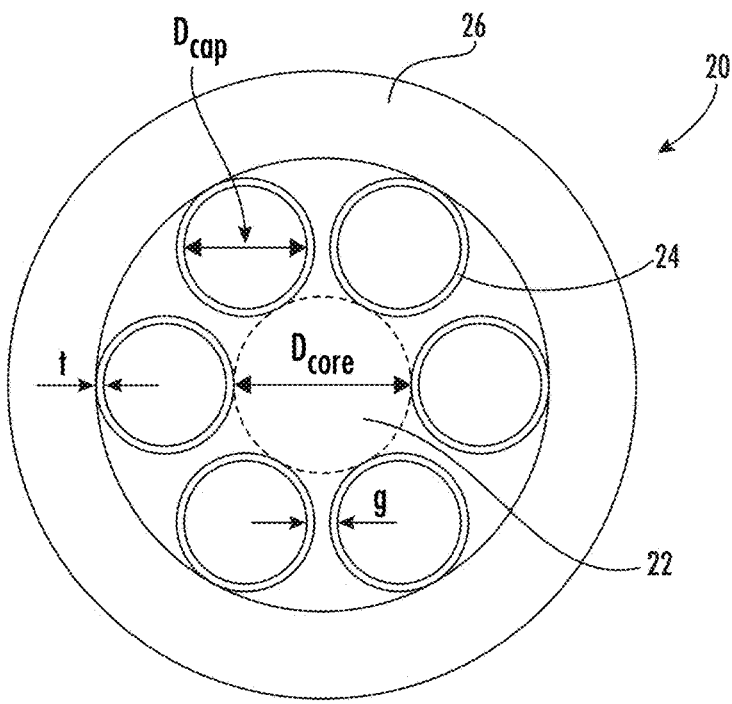
FIG. 2 is a cross-sectional view of hollow core anti-resonant optical fiber.

FIG. 2 is a cross-sectional view of hollow core anti-resonant optical fiber 20 having a hollow core 22 surrounded by a single ring of anti-resonant tube elements (e.g., thin glass membranes or capillaries) 24 each separated by a gap g, surrounded by glass cladding 26. An optical signal in a hollow core anti-resonant fiber 20 propagates in the hollow core 22 (e.g., in air contained therein), and signal guidance is based on an anti-resonance from the thin, non-touching tube elements 24 surrounding the hollow core 22. The thickness t and diameter ($D_{cap}$) of the tube elements 24, together with dimensions of the gap g between adjacent tube elements 24, are selected to provide anti-resonant properties that result in low signal attenuation for transmission of optical signals in the hollow core 22.

Figure 3:
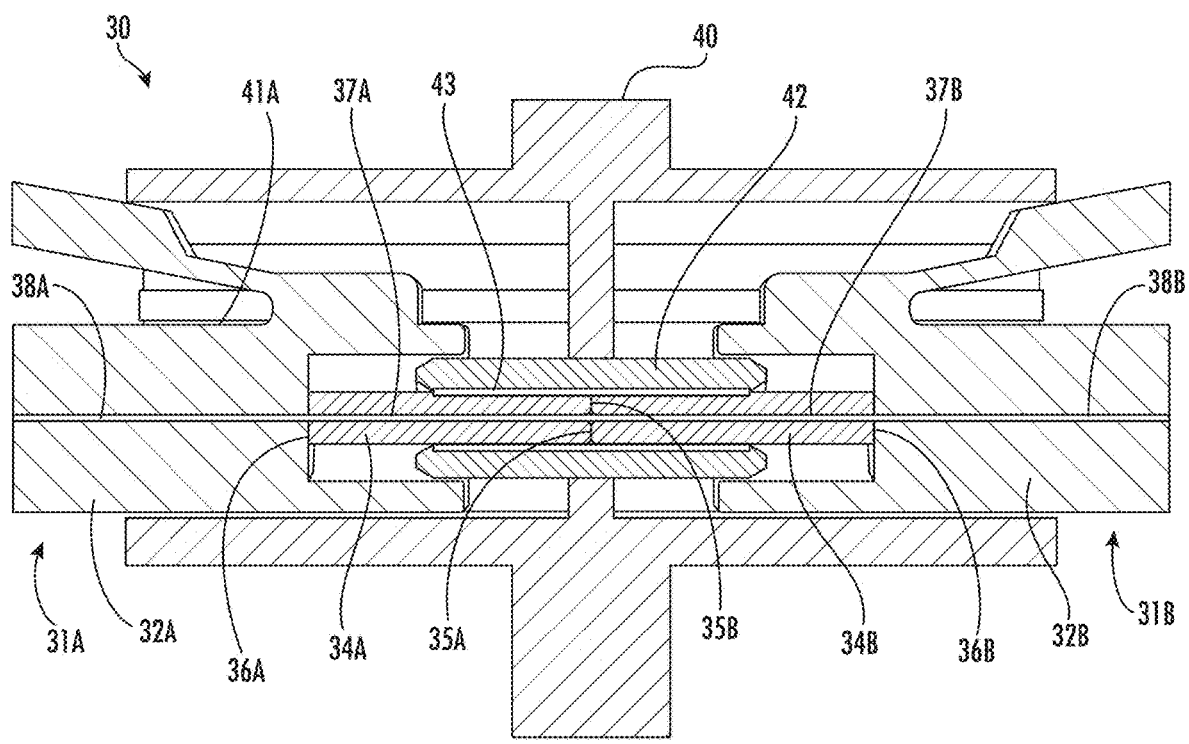
FIG. 3 is a cross-sectional view of a conventional optical fiber connector interface including two solid core optical fiber connectors in a mating relationship with physical contact between ferrule end faces and between optical fibers supported by the ferrules.

FIG. 3 is a cross-sectional view of a conventional optical fiber connector interface 30 including two optical fiber connectors 31A-31B received within openings 41A-41B of an adapter 40. Each connector 31A-31B includes a body 32A-32B that supports a ferrule 34A-34B, with an optical fiber 38A-38B extending through the body 32A-32B and the corresponding ferrule 34A-34B to a proximal end face 35A-35B thereof. The ferrules 34A-34B are received within a sleeve 43 of the adapter 40, and are in a mating relationship with physical contact between the proximal end faces 35A-34B and between ends of the optical fibers 38A, 38B therein. As shown, each optical fibers 38A-38B is coaxially arranged within the corresponding ferrule 34A-34B, and extends through a center of a distal end face 36A-36B to a center of the proximal end face 35A-35B, with the proximal end faces 35A-35B being parallel to one another. The ferrules 34A-

34B may be cylindrical in shape, and fabricated of ceramic, glass, or polymeric materials.

Figure 4:
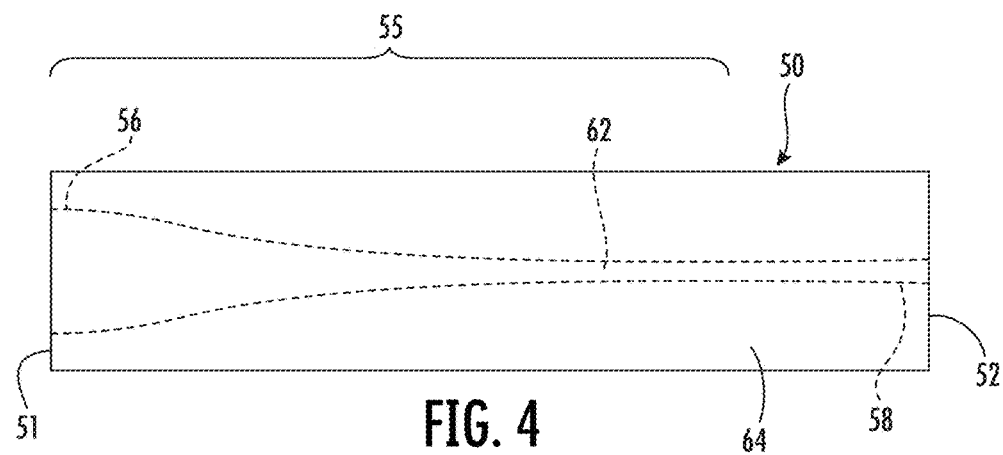
FIG. 4 is a cross-sectional view of a solid core optical fiber segment including a mode field diameter transition region.

FIG. 4 is a cross-sectional view of a solid core optical fiber segment 50 that includes a mode field diameter (MFD) transition region 55 between ends 51, 52 thereof. The MFD transition region 56 is coaxially aligned with a core 62 of the optical fiber 50, which is surrounded by cladding 64. The MFD transition region 55 has a tapered core that provides a gradient MFD, to serves as a transition between an expanded core region 56 having a large MFD value, and an unexpanded core region 58 having a smaller MFD value. In some embodiments, the MFD transition region has a tapered profile, which may include a linear taper, a parabolic taper, an exponential taper, or a Gaussian taper. Starting with differential doping between the core 62 and the cladding 64, the MFD transition region 55 may be produced by heating a portion of the optical fiber segment 50 (e.g., in a fiber splicing apparatus) at a sufficient temperature and for a sufficient time to cause diffusion of one or more dopants (e.g., halogen dopants) from the core 62 to the cladding 64, and/or from the cladding 64 to the core 62, as will be discussed in more detail hereinafter. Various methods for forming a MFD transition region in a solid core optical fiber (e.g., having a chlorine doped core, optionally in combination with fluorine doped cladding), including exposure to temperatures in a range of 1700° C. to 2100° C., using a fusion splicer, are disclosed in U.S. Pat. No. 10,429,589 assigned to Corning Inc. (Corning, New York, US), wherein the entire contents of the foregoing patent are hereby incorporated by reference herein.

In embodiments of the present disclosure, a MFD transition region (such as described in connection FIG. 4) may be utilized in a ferrule that may be incorporated in a fiber optic coupling assembly, to facilitate interfacing between a solid core optical fiber and a hollow core optical fiber. Desirably, a MFD transition region may have a low numerical aperture and an adiabatic taper, with a MFD value at one end that matches a MFD value of a HC optical fiber, and a MFD value at an opposing end that matches a MFD value of a SC optical fiber, to serve as a low-loss bridge between SC and HC optical fibers. Control of a length of expansion of a core in a MFD transition region may provide an adiabatic transition from one MFD value to another with minimal or limited loss, wherein such length may be on the order of a few millimeters.

In some embodiments, a MFD transition region has a substantially adiabatic taper, in which a core diameter slope satisfies the following equation:

$$dD/dz \leq 2(D/\lambda)^*(n_{\mathit{eff}} - n_{cl})$$ [Equation 1], where D is the core diameter at a position z within the tapered core region, $\lambda$ is the operating wavelength, $n_{\mathit{eff}}$ is the effective index of the fundamental mode, and $n_{cl}$ is the refractive index of the cladding. The effective index of the core can be calculated from the following equation:

$$n_{\mathit{eff}} = \lambda \Delta \beta / 2\pi$$ [Equation 2], where $\Delta\beta$ is calculated as the difference between $\beta 1$ and $\beta 2$, which are propagation constants for the fundamental and the second local mode. Defining $D_{max}$ and $D_{min}$ as the maximum and minimum core diameter over tapered length L, in certain embodiments, the parameter $(D_{max} - D_{min})/L$ is less than 100 microns/mm, or less than 50 microns/mm, or less than 25 microns/mm.

In certain embodiments, a MFD transition region can be prepared in a commercial splicer by splicing two doped optical fiber ends (e.g., a bridge optical fiber), and cleaving the resulting splice at the center point.

Figure 5:
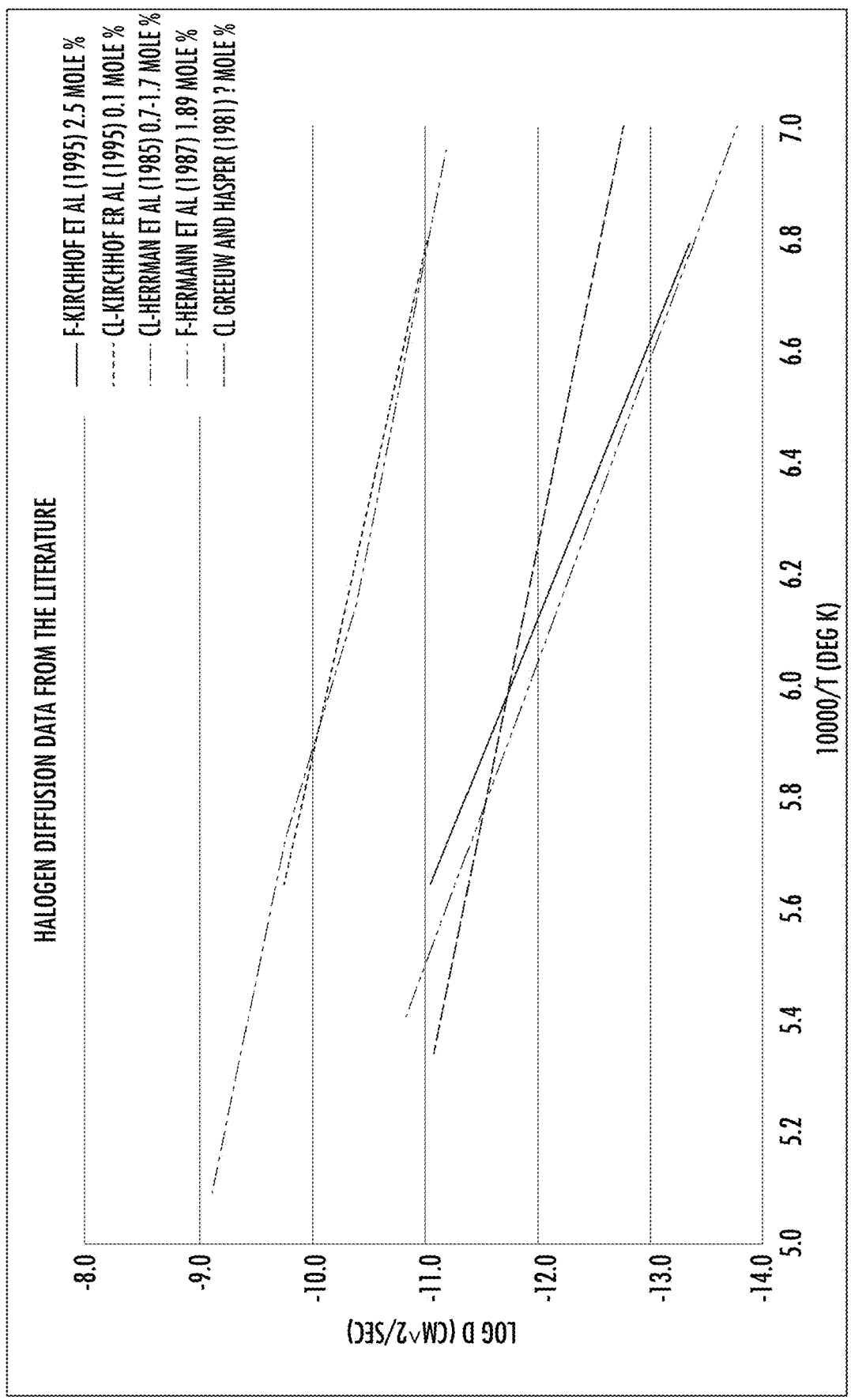
FIG. 5 is a plot of diffusivity rates for different halogen dopants used in fiber cores each clad with silica as a function of temperature, based on data obtained from literature.

As mentioned previously, the core of a SC optical fiber may be expanded by heating an optical fiber segment according to sufficient time and temperature conditions to cause diffusion of dopants from a core to cladding and/or from cladding to a core of the optical fiber. In principle, such doping could be performed with Ge doped silica fiber; however, Ge has a relatively low diffusivity rate (e.g., $4 \times 10^{-16}$ m$^2$/s at 1300° C.) such that an inordinately long duration of treatment may be required. Doping with a single halogen may be similar to Ge doping. For example, if F-doped cladding is arranged over a pure silica core, F on its own has a relatively low diffusivity value of about $0.5 \times 10^{-16}$ m$^2$/s at 1300° C. FIG. 5 is a plot of diffusivity rates for different halogen dopants (with individual data points for Ge and F dopants) used in fiber cores each clad with silica as a function of temperature, based on data obtained from literature.

Figure 6:
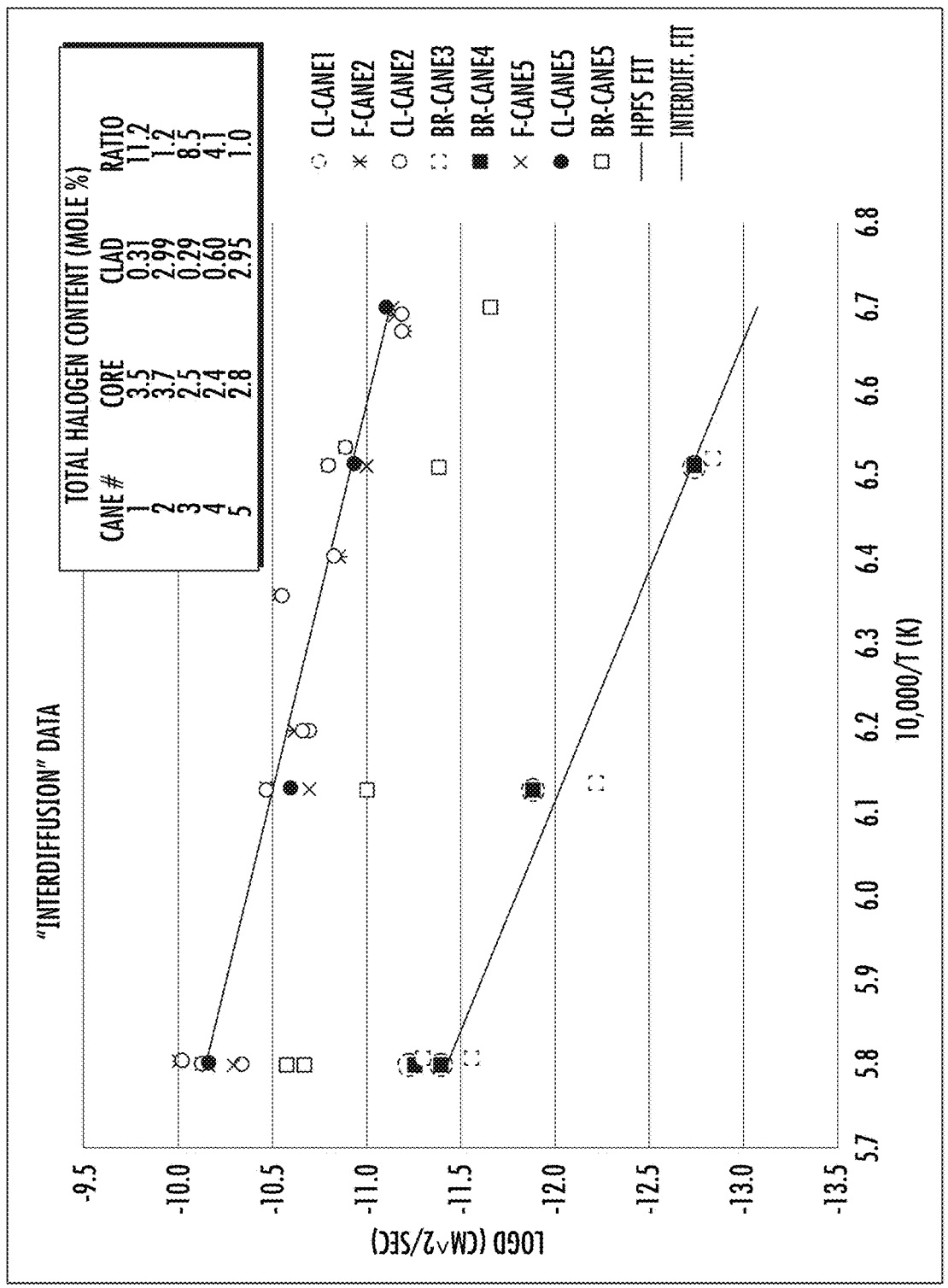
FIG. 6 is a plot of diffusion data for glass canes doped with various combinations of different halogen materials in core regions and cladding regions thereof, based on data obtained from an experimental and molecular dynamic simulation study by Hanson, B, et al.

However, if two or more halogen dopants are provided (such as Cl dopant in a silica core and F dopant in cladding), the diffusivity can be dramatically increased by two to three orders of magnitude due to the interdiffusion effect, thereby permitting a core (and MFD) profile to be expanded more quickly and to a greater extent. This difference in diffusivity between single dopant species and multiple dopants is visible in FIG. 6, which plots diffusion data for glass canes doped with various combinations of different halogen materials in core regions and cladding regions thereof, based on data obtained from RTR 126388, Experimental and Molecular Dynamic Simulation Study of the Diffusion of Halogens in Fused Silica, by Ben Hanson, Alex Mitchell, Matthew McKenzie and Steve Tietjean.

Figure 7:
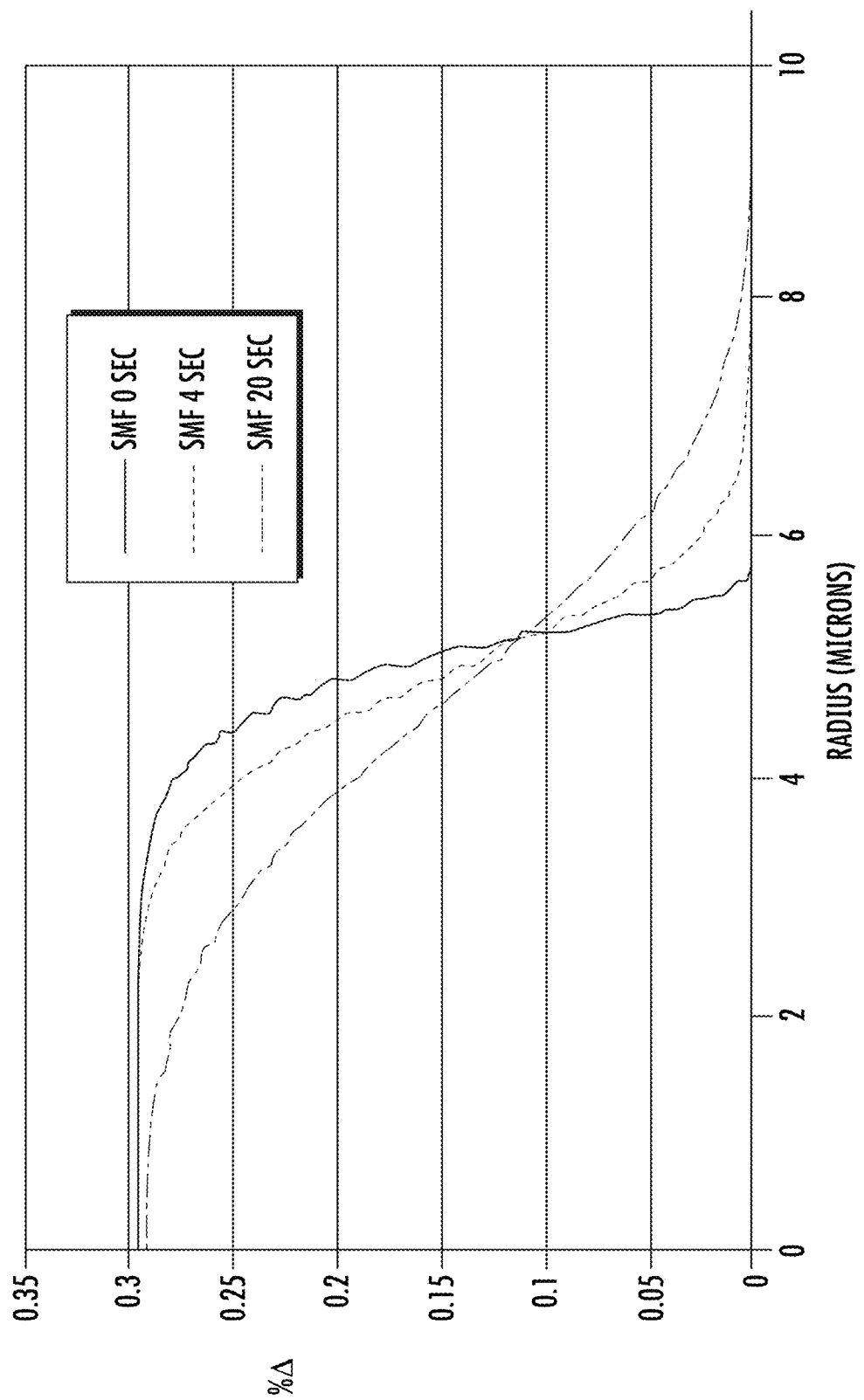
FIG. 7 is a plot of change in index of refraction as a function of radius, showing expansion of the index of refraction due to heating of Ge-doped single mode fiber at different heating times in a fusion splicer.

The effect on expansion of index of refraction profile due to exposure of a Ge doped single mode fiber (SMF) to different heating regimes (i.e., times of 0 seconds, 4 seconds, and 20 seconds) in a fusion splicer is shown in FIG. 7. The diffusion of the dopant and corresponding diffusion of the index of refraction profile leads to MFD expansion. With a proper thermal treatment, an adiabatic taper can be formed.

Figure 8:
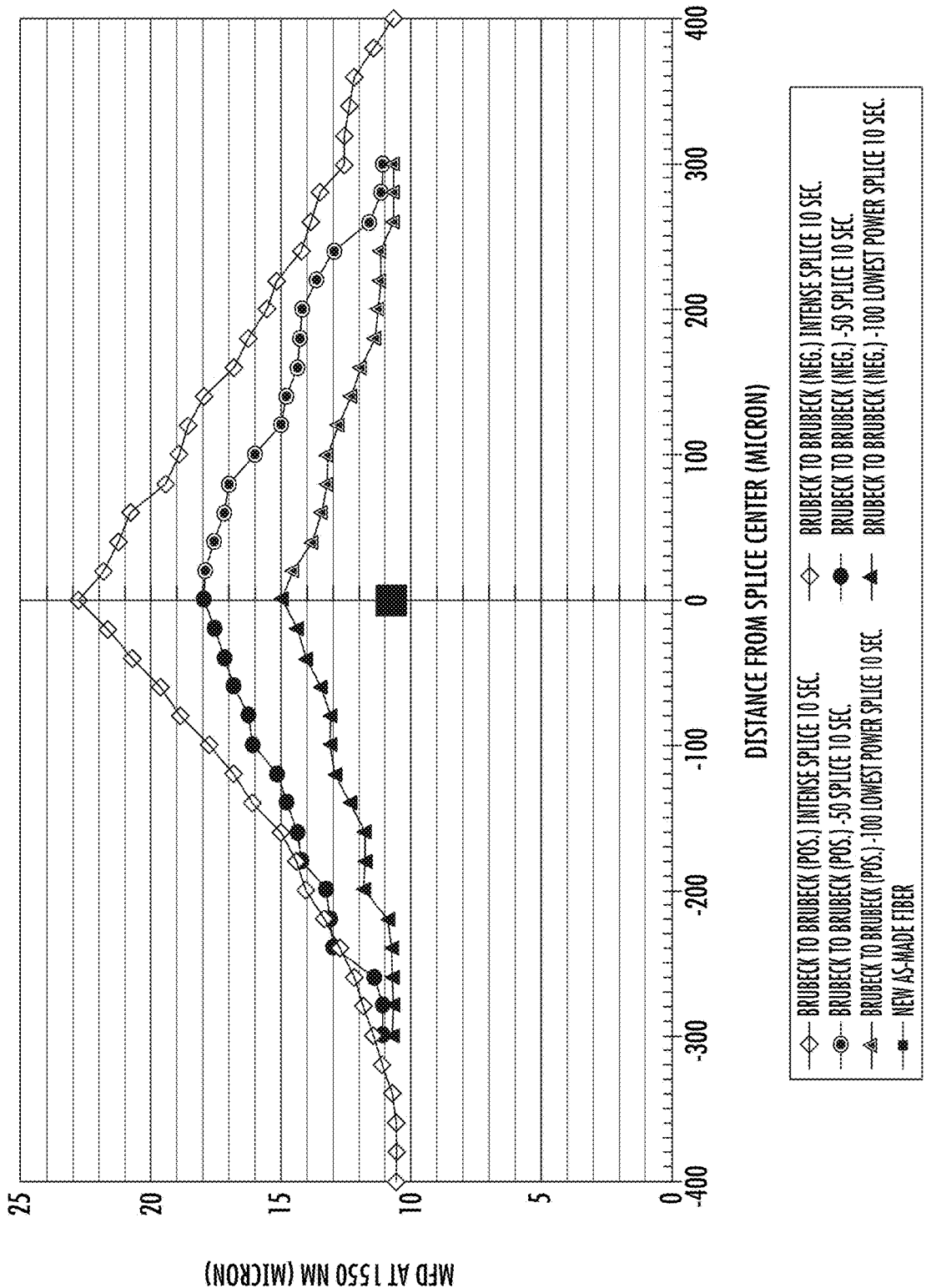
FIG. 8 is a plot of mode field diameter at 1550 nm for a single mode optical fiber having a 1.8 wt. % chlorine doped core and fluorine doped cladding heated in a fusion splicer a at three different temperatures (1900° C., 1850° C., and 1800° C.) as a function of distance from the splice point.

Relative to Ge doping, the higher diffusivity of halogen dopants allows for significant expansion of the mode field diameter by heating a portion of a doped optical fiber. FIG. 8 is a plot of mode field diameter at 1550 nm for a single mode optical fiber having a 1.8 wt. % chlorine doped core and fluorine doped cladding heated in a fusion splicer at three different temperatures (1900° C., 1850° C., and 1800° C.) as a function of distance from the splice point. Because of the large diffusivity of chlorine in the glass, it is observed that fibers having MFD at 1550 nm of 10.5 µm can have their MFD expanded to as much as 23 µm. Moreover, this MFD transition can occur within a short distance, since FIG. 8 shows that baseline MFD values 10.5 µm are observed within ±400 µm from a splice center.

Figure 9:
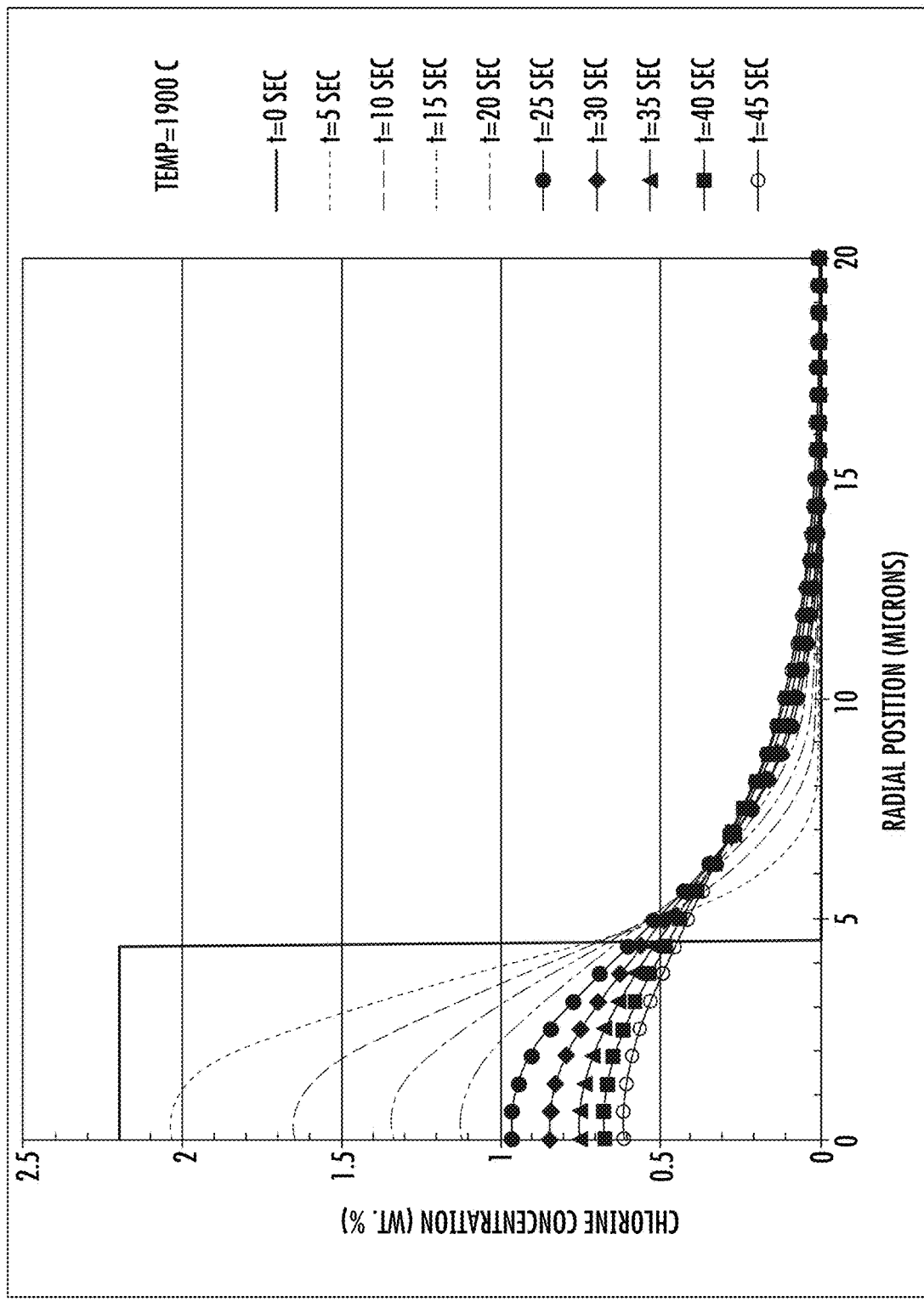
FIG. 9 is a plot of modeled chlorine concentration versus radial position for a single mode fiber having a chlorine doped core and a fluorine doped cladding subjected to heating at 1900° C. for ten different time periods.

FIG. 9 is a plot of modeled chlorine concentration versus radial position for a single mode fiber having a chlorine doped core and a fluorine doped cladding subjected to heating at 1900° C. for ten different time periods. As shown, initial Cl concentration in the core was 2.2 wt. % and no portion of the chlorine extended more than 4.5 µm from a radial center position before heating, but heating for 45 seconds reduced the Cl concentration in the core to below 0.6 µm, with measurable dopant extending to a radial position of more than 10 µm from the radial center.

Figure 10:
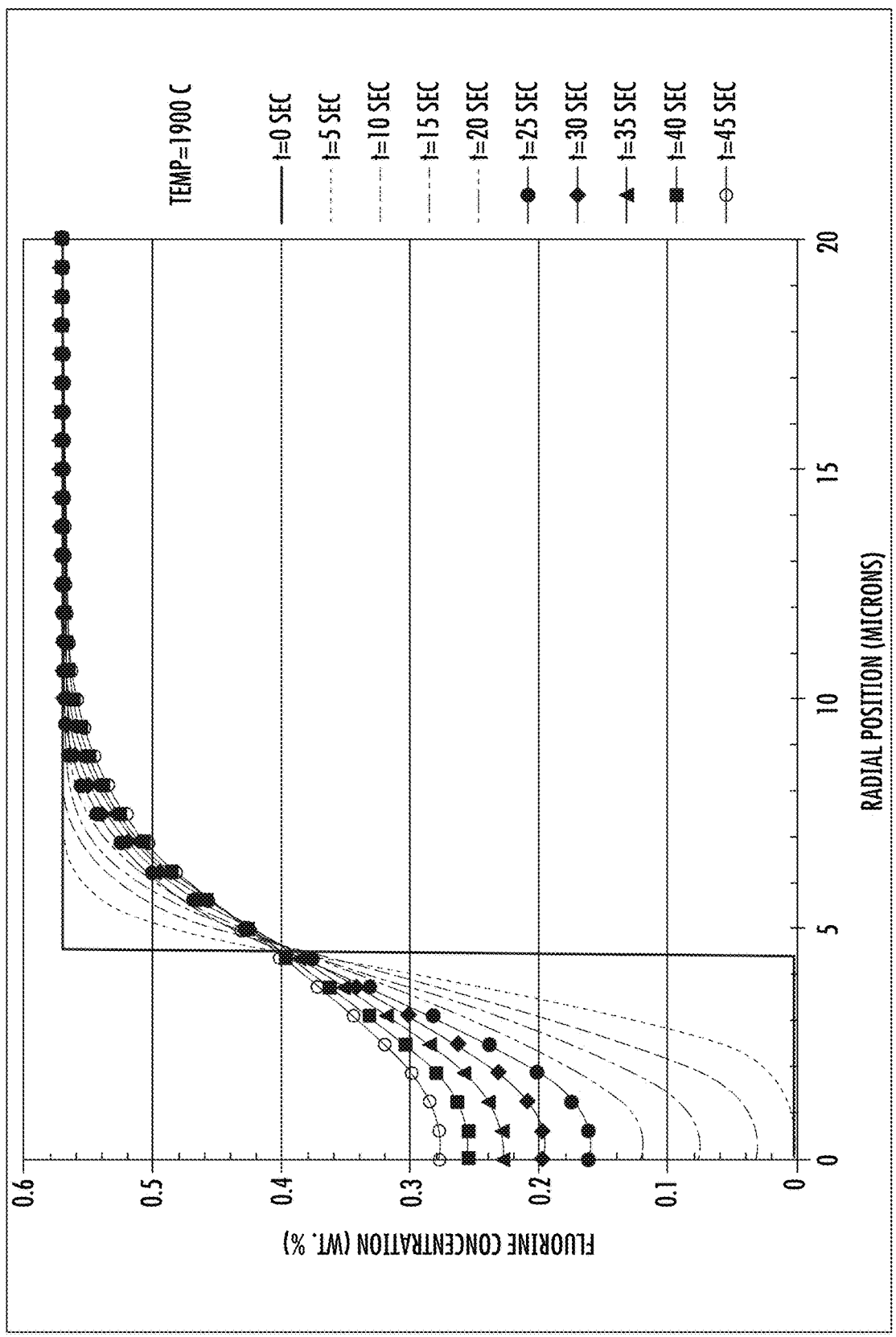
FIG. 10 is a plot of modeled fluorine concentration versus radial position for a single mode fiber having a chlorine doped core and a fluorine doped cladding subjected to heating at 1900° C. for ten different time periods.

FIG. 10 is a plot of modeled fluorine concentration versus radial position for a single mode fiber having a chlorine doped core and a fluorine doped cladding subjected to heating at 1900° C. for ten different time periods. As shown, initial F concentration was 0.57 wt. % in the cladding, and no portion of the F doping chlorine extended within 4.5 µm of a radial center position before heating, but heating for 45 seconds increased the F concentration in the core to values in a range of 0.28 to 0.4 wt. %, while causing F concentration to decline in the cladding (e.g., at radial positions in a range of 4.5 µm to about 11 µm).

Figure 11:
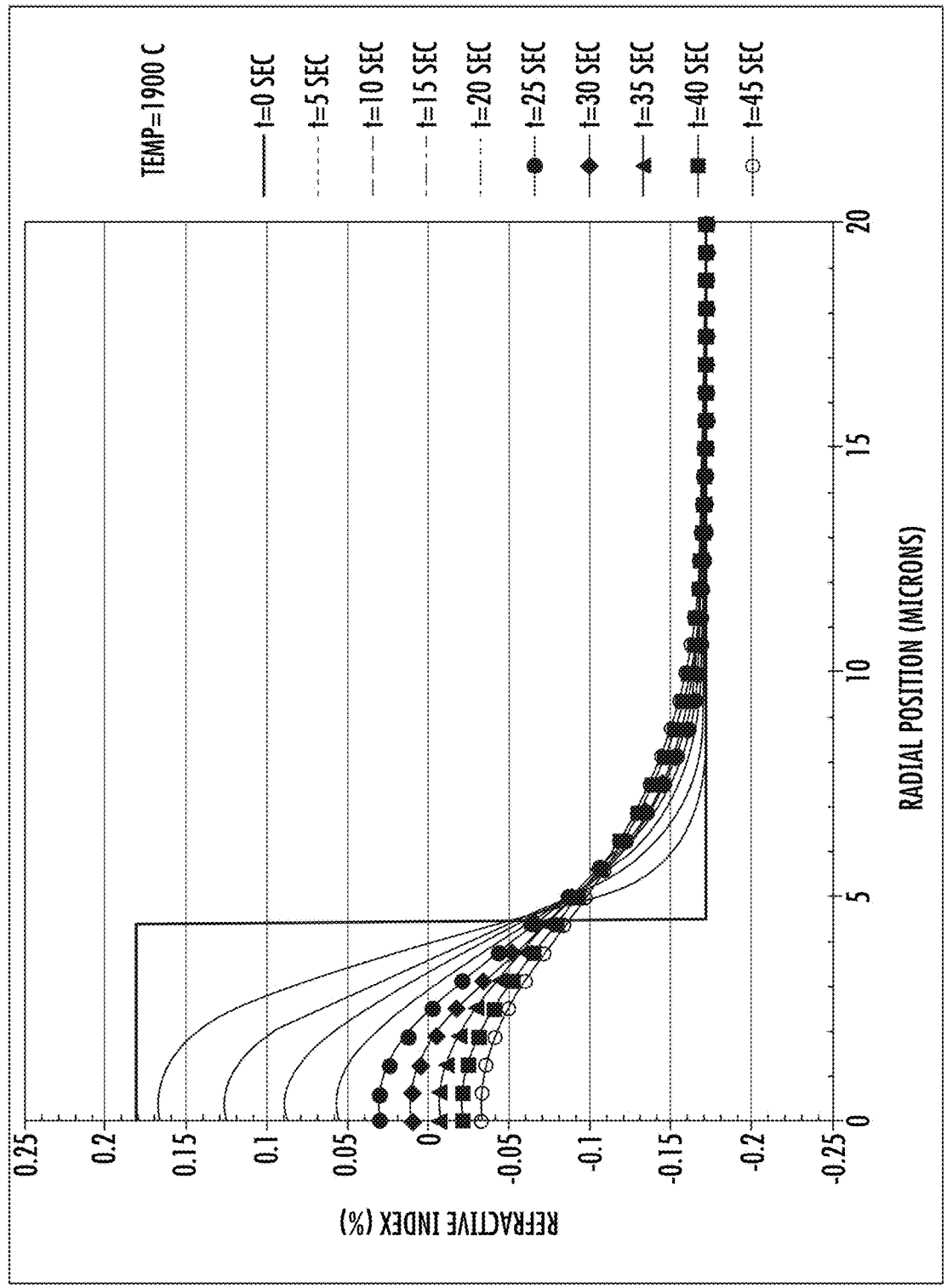
FIG. 11 is a plot of modeled refractive index (%) as a function of radial position for a single mode fiber having a chlorine doped core and a fluorine doped cladding subjected to heating at 1900° C. for ten different time periods.

FIG. 11 is a plot of modeled refractive index (%) as a function of radial position for a single mode fiber having a chlorine doped core and a fluorine doped cladding subjected to heating at 1900° C. for ten different time periods. Significant changes in refractive index profile as a function of heating time are observed.

Figure 12:
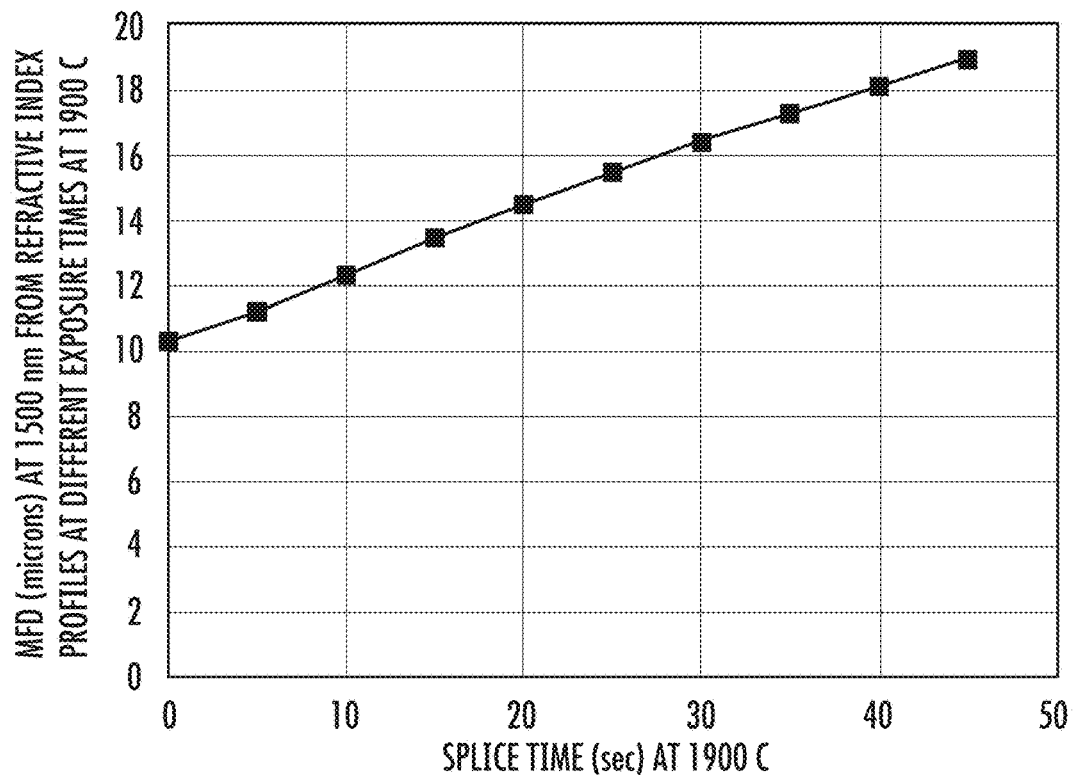
FIG. 12 is a plot of modeled mode field diameter at 1500 nm (obtained from the refractive index profiles of FIG. 11) as a function of radial position for a single mode fiber having a chlorine doped core and a fluorine doped cladding subjected to heating at 1900° C. for ten different time periods.

FIG. 12 is a plot of modeled mode field diameter at 1500 nm (obtained from the refractive index profiles of FIG. 11) as a function of radial position for a single mode fiber having a chlorine doped core and a fluorine doped cladding subjected to heating at 1900° C. for ten different time periods. As shown, MFD values increased from 10 µm to 19 µm for a heating time of 45 seconds. Additional expansion of MFD is anticipated by optimization of doping and heating profiles.

The preceding discussion concerned formation of MFD transition regions for use in embodiments of the present disclosure to ameliorate issues of significant mismatch between MFD values for SC and HC optical fibers.

As mentioned previously herein, attempts to couple SC and HC optical fibers by simple butt coupling may also result in significant Fresnel reflection losses, leading to increased insertion losses and back reflections to a HC optical fiber. In certain embodiments, these issues may be addressed by providing or processing end faces of one or more ferrules and (either SC or HC) optical fiber ends coincident therewith to be non-perpendicular (e.g., non-perpendicular by an angular range of about 1 degree to about 3 degrees, or another threshold range identified herein) to a longitudinal axis of the ferrule(s). In certain embodiments, proximal (mating) end faces of ferrules may be non-parallel, such that only a minor portion of one ferrule end face is in contact with an adjacent ferrule end face. In certain embodiments, proximal end faces of ferrules may be parallel to one another, such that a majority, or substantially an entirety, of one ferrule end face is in contact with an adjacent ferrule end face, but each ferrule end face (and corresponding optical fiber end face) may be non-perpendicular to a longitudinal axis of the bore (and a longitudinal axis of the optical fiber). In certain embodiments, back reflection along an HC-LC fiber interface can be reduced (or further reduced) by addition of at least one antireflection (AR) coating to an end of a SC optical fiber (particularly to an expanded core/expanded MFD region of a MFD interface region), wherein the AR coating(s) may additionally extend over substantially an entire ferrule end face. AR coatings will be discussed hereinafter, followed by a discussion of angled end faces for ferrules and optical fibers.

Figure 13:
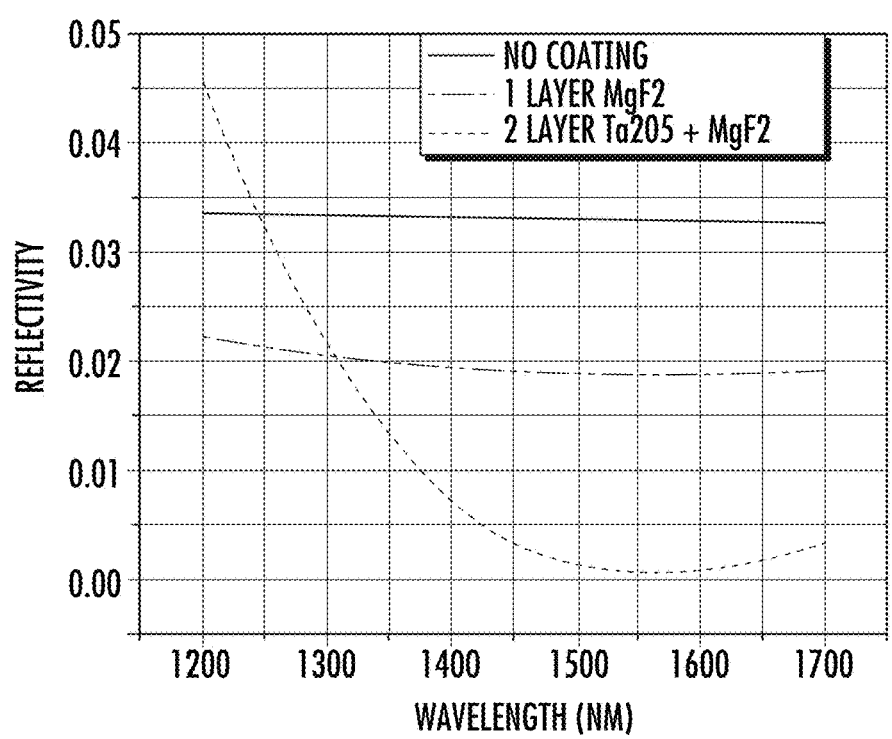
FIG. 13 is a plot of reflectivity versus wavelength at a silica/air interface at a zero degree incident angle and random polarization, for uncoated silica, for silica coated with a thin layer of $MgF_2$, and for silica sequentially coated with thin layers of $Ta_2O_4$ and $MgF_2$.

FIG. 13 is a plot of reflectivity versus wavelength at a silica/air interface at a zero degree incident angle and random polarization, for uncoated silica, for silica coated with a thin layer of MgF$_2$, and for silica sequentially coated with thin layers of Ta$_2$O$_4$ and MgF$_2$. As shown, uncoated silica exhibits nearly constant reflectivity values in excess of 3.2% for all wavelengths between 1200-1700 nm. Addition of a thin layer of MgF$_2$ reduces reflectivity to values below 2% for wavelengths between 1310-1700 nm. Providing dual layers of Ta$_2$O$_4$ and MgF$_2$ reduces reflectivity to less than 0.1% at the commercially important wavelength of 1550 nm, although this dual layer confers greater variability in reflectivity with respect to wavelength, as a curvilinear relationship between reflectivity and wavelength is shown.

While antireflection coating(s) at a normal (perpendicular) incident angle provides a return loss of about −30 dB, this level does not meet the requirement of high speed transceivers with advanced modulation formats such as PAM4. Further improvement of the return loss (e.g., to −65 dB) may be obtained by polishing or cleaving an optical fiber end face (i.e., a SC and/or a HC optical fiber end face) at a small angle away from perpendicular to a longitudinal axis, wherein this polishing or cleaving may be performed while the optical fiber is installed in a ferrule. The magnitude of this small angle is inversely proportional to the MFD at the fiber end face. For example, if the MFD of a HC optical fiber is larger than 25 µm, then a 3.2° end face angle on the HC optical fiber or a mating SC fiber (including a MFD transition region) is necessary to achieve the same return loss (<−65 dB) as a standard glass fiber with 8° angled surface. The addition of one or more antireflection coatings at the end face of a SC optical fiber will further suppress undesirable return loss. In certain embodiments, a ferrule with an angled end face may be assembled in a ferrule holder having a key defining the orientation of the angled end face.

In certain embodiments, an optical fiber (either SC or HC) may be contained in a bore of a ferrule extending between proximal and distal ends of the ferrule, with the bore being non-parallel to a longitudinal axis of the ferrule. Providing a ferrule bore that is non-parallel to a longitudinal axis of the ferrule permits the mode emanating from an HC optical fiber to be highly collinear with the mode emanating from a SC optical fiber for a HC-SC optical fiber interface utilizing a MFD transition region. In certain embodiments, a bore of a ferrule (and an optical fiber contained in the bore) has an off axis angle in a range of 1.0° to 1.5° relative to a longitudinal axis of the ferrule, for a ferrule having an end face perpendicular to the longitudinal axis.

In certain embodiments, a HC-SC optical fiber interface utilizing a MFD transition region includes one ferrule having an end face perpendicular to a longitudinal axis thereof, while the other ferrule has an end face non-perpendicular to a longitudinal axis thereof, with the end faces of the ferrules being non-parallel to one another. In certain embodiments, a HC-SC optical fiber interface utilizing a MFD transition region includes one ferrule having an end face non-perpendicular to a longitudinal axis thereof, while the other ferrule has an end face non-perpendicular to a longitudinal axis thereof, and the end faces of both ferrules are parallel to one another. In certain embodiments, a HC-SC optical fiber interface utilizing a MFD transition region includes one ferrule having a bore that is non-parallel to a longitudinal axis thereof, while the other ferrule has a bore that is parallel to a longitudinal axis thereof. Various combinations of ferrule end face configurations and bore configurations for a HC-SC optical fiber interface utilizing a MFD transition region are contemplated, as discussed hereinafter.

In certain embodiments, an interface between a HC optical fiber and a SC optical fiber includes a SC optical fiber with a MFD transition region and that is terminated by a first ferrule having a perpendicular end face and a bore that is parallel to (e.g., coaxial with) a longitudinal axis of the first ferrule, and a HC fiber terminated by a second ferrule having a non-perpendicular end face and a bore that is non-parallel to (e.g., non-coaxial with) a longitudinal axis of the second ferrule. In certain embodiments, an interface between a HC optical fiber and a SC optical fiber includes a SC optical fiber with a MFD transition region and that is terminated by a first ferrule having a non-perpendicular end face and a bore that is non-parallel to a longitudinal axis of the first ferrule, and a FTC fiber terminated by a second ferrule having a perpendicular end face and a bore that is parallel to (e.g., coaxial with) a longitudinal axis of the second ferrule.

Figure 14A:
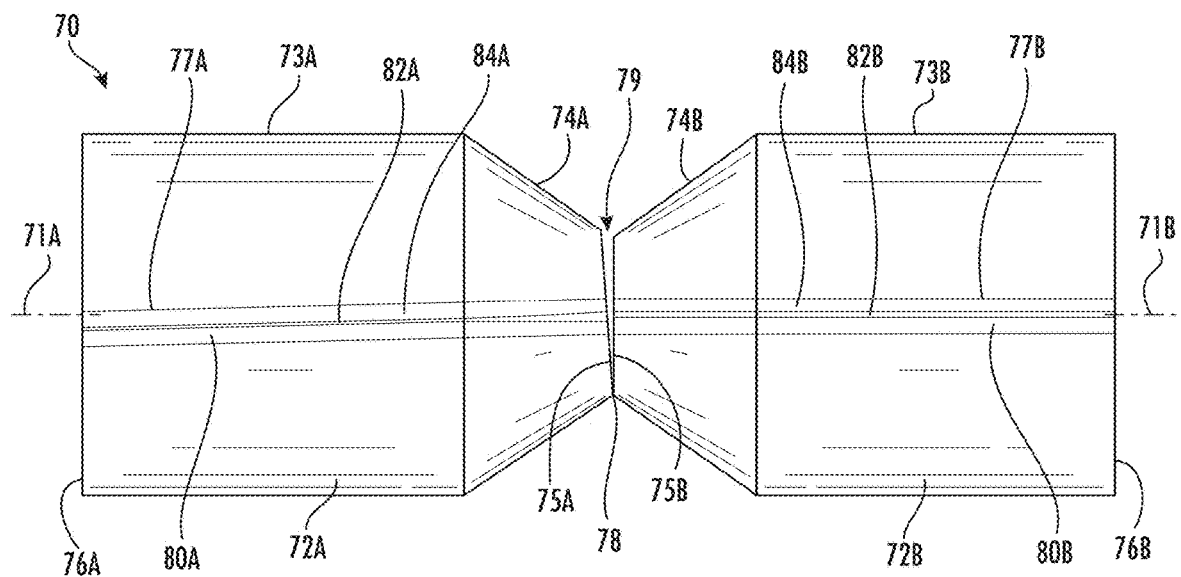
FIG. 14A is a cross-sectional schematic view of two fiber optic ferrules having non-parallel end faces contacting one another along limited portions of the end faces, with an air gap between remaining portions of the end faces, with one ferrule bore containing a solid core optical fiber with a mode field diameter transition region proximate to a ferrule end face that is non-perpendicular to a longitudinal axis of the ferrule, and with the other ferrule bore containing a hollow core optical fiber and an end face that is substantially perpendicular to a longitudinal axis of the ferrule end face.
Figure 14B:
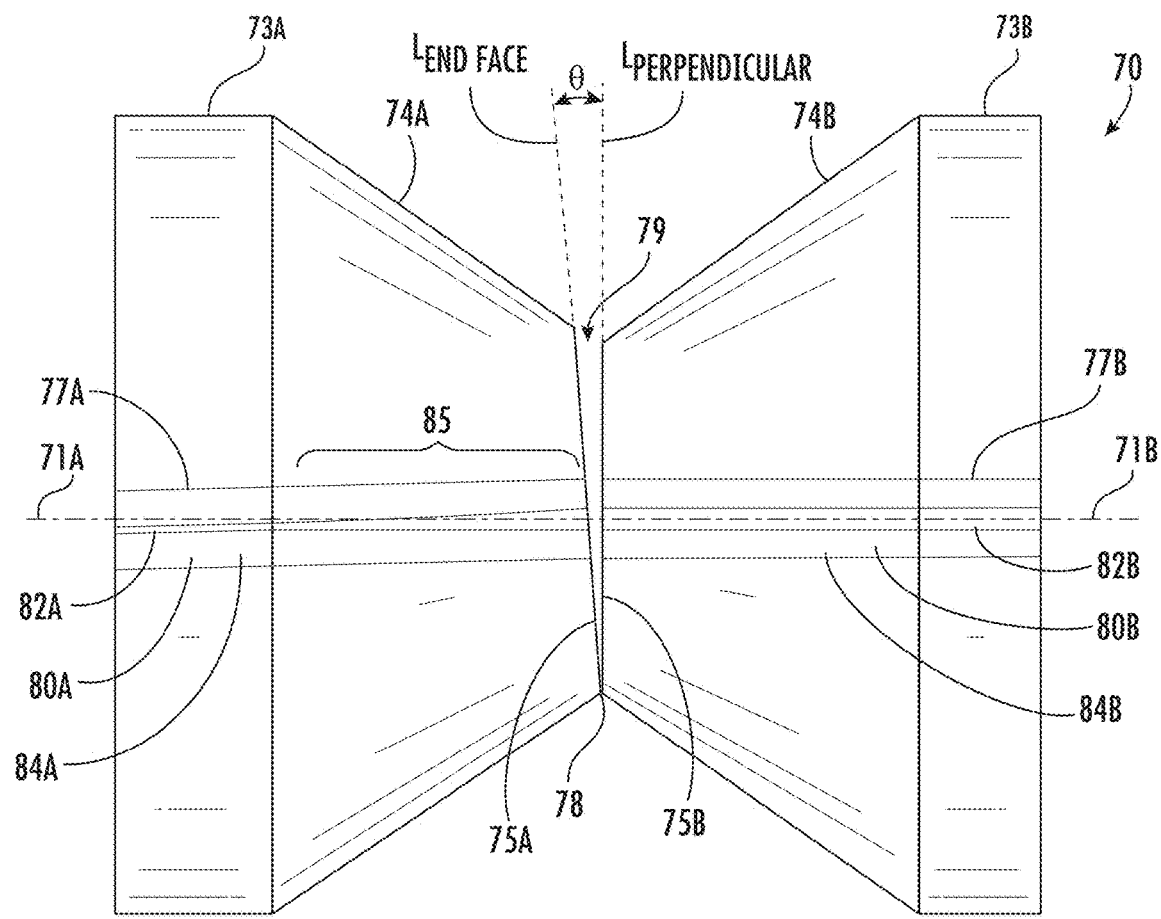
FIG. 14B is a magnified view of a portion of FIG. 14A, showing the mode field diameter transition region proximate to the ferrule end face.

FIG. 14A is a cross-sectional schematic view of a fiber optic coupling assembly 70, and FIG. 14B is a magnified central portion of the fiber optic coupling assembly 70, for coupling a SC optical fiber 80A contained in a first bore 77A of a first fiber optic ferrule 76A with a HC optical fiber 80B contained in a second bore 77B of a second optic ferrule 76B, wherein proximal end faces 75A, 75B of the respective fiber optic ferrules 76A, 76B are non-parallel to one another. A contact region 78 is provided along limited or small portions of the proximal end faces 75A, 75B, while an air gap 79 is provided between remaining portions of the proximal end faces 75A, 75B, with the air gap 79 extending between proximal ends of the optical fibers 80A, 80B. If the proximal end faces 75A, 75B are chamfered to a width of 1 mm, then the width of the air gap 79 for the fiber mode to propagate in free space is about 41 µm, which is much smaller than the Rayleigh length (about 374 µm at 1310 nm) if the HC optical fiber 80B has a MFD value of 25 µm, such that the effect of the air gap 79 on coupling loss is negligible. To avoid contamination issues, connectors supporting the ferrules 72A-72B may be sealed to prevent dust and moisture from entering the air gap 70 and potentially entering the FTC optical fiber 80B.

Each ferrule 72A, 72B includes a main body 73A, 73B (which may be cylindrical in shape) terminating at a distal end face 76A, 76B, includes a frustoconical portion 74A, 74B terminating at the proximal end face 75A, 75B, and includes a longitudinal axis 71A, 71B that is centered with respect to the main body 73A, 73B. The first optical fiber 80A is a SC optical fiber having a solid core 82A surrounded by cladding 84A, and includes a MFD transition region 85 proximate to the proximal end face 75A of the first ferrule 72. A MFD of the first optical fiber 80A is larger at the proximal end face 75A than at the distal end face 76A. As shown, the first bore 77A is non-parallel to a first longitudinal axis 71A of the first ferrule 72A, and the first proximal end face 75A is non-perpendicular to the first longitudinal axis 71A. The second optical fiber 80B is a HC optical fiber having a hollow core 82B surrounded by cladding 84B, with a constant MFD. As shown, the second bore 77B defined in the second ferrule 72B is parallel to a second longitudinal axis 71B of the second ferrule 72B, and the second proximal end face 75B is perpendicular to the second longitudinal axis 71B. Assuming each ferrule main body 73A, 73B has a cylindrical shape, each optical fiber 80A, 80B is coincident with the corresponding longitudinal axis 71A, 71B at the corresponding proximal end face 75A, 75B. The proximal end face 75B of the second ferrule 72B (which may be referred to as the second proximal end face 75B) is perpendicular to the second longitudinal axis 71B, while the proximal end face 75A of the first ferrule 72A (which may be referred to as the first proximal end face 75A) is non-parallel to the second proximal end face 75B. One line $L_{PERPENDICULAR}$ is perpendicular to the second longitudinal axis 71B and is parallel to the second end face 75B, while another line $L_{END\ FACE}$ is parallel to the first end face 75A, and a nonzero angle Θ is defined between $L_{PERPENDICULAR}$ and line $L_{END\ FACE}$. In use, a mode emitted by the hollow core 82B of the second (HC) optical fiber 80B is transmitted across the gap 79 between the proximal end faces 75B, 75B into the MFD transition region 75 of the first (SC) optical fiber 80A, and is conveyed to the core 82A of the first optical fiber 80A having a smaller MFD proximate to the distal end

Figure 15A:
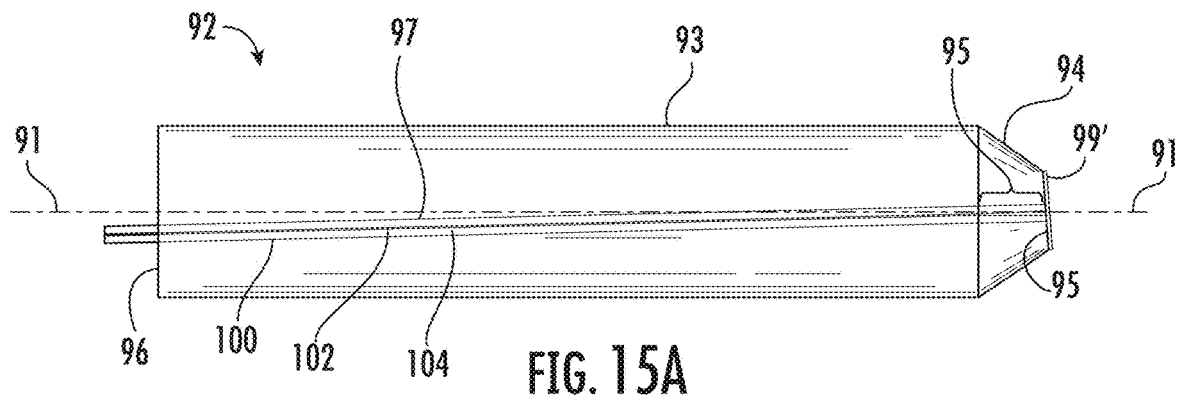
FIG. 15A is a cross-sectional schematic view of a fiber optic ferrule having a bore that is non-parallel with a longitudinal axis of the ferrule, having a ferrule end face and antireflection coating that are non-perpendicular to the longitudinal axis of the ferrule, and with the bore containing a solid core optical fiber with a mode field diameter transition region.
Figure 15B:
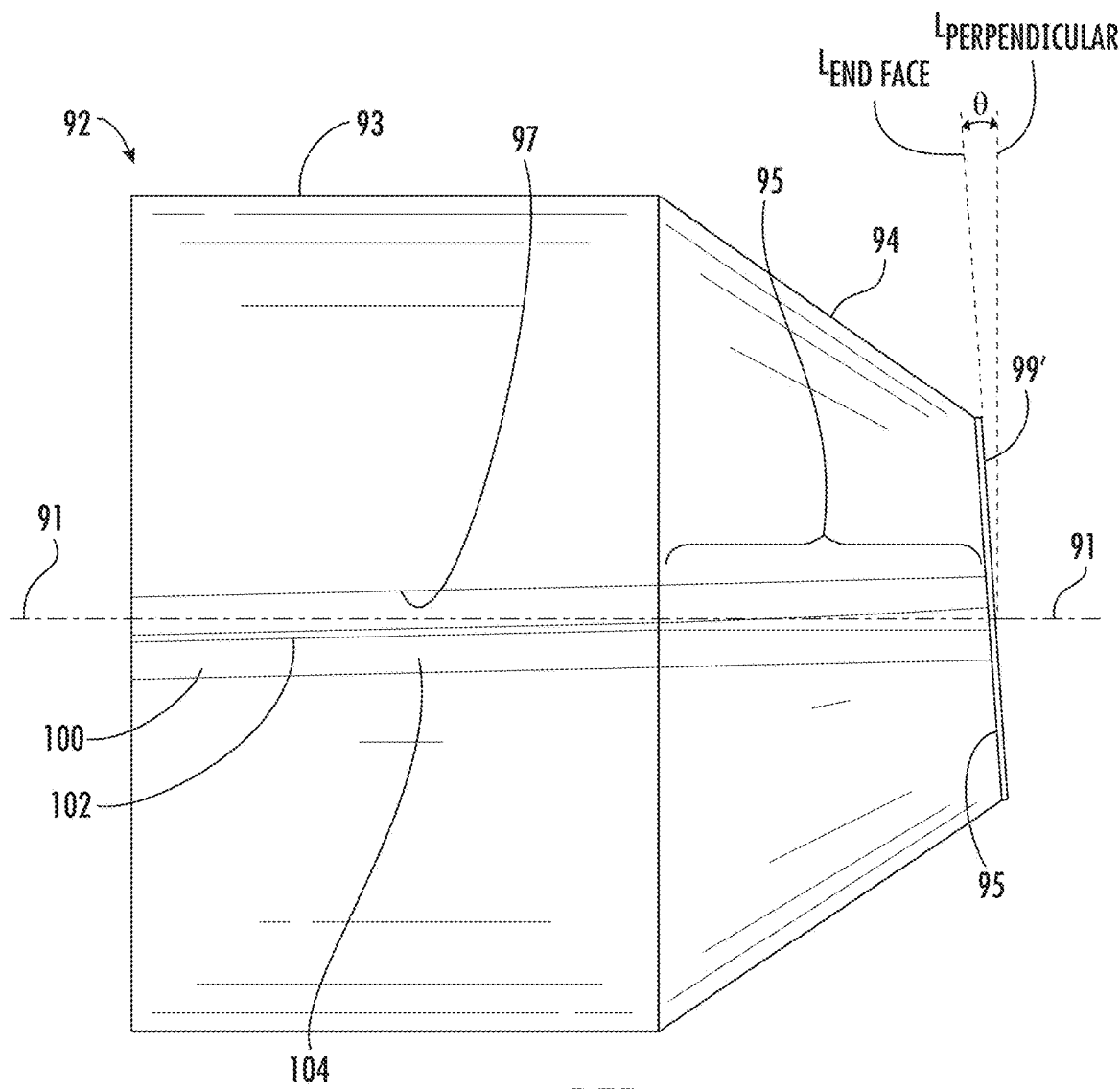
FIG. 15B is a is a magnified view of a portion of FIG. 15A, showing the ferrule end face and mode field diameter transition region.

76A of the first ferrule 72A. Orientation of the proximal end faces 75A, 75B and orientation of the first bore 77A (and the first optical fiber 80A disposed therein) are selected to cause a beam emanating from the second optical fiber 80B and refracted across the air gap 79 to be propagated through the MFD transition region 85 and the core 82A of the first optical fiber 80A in a direction aligned with the core 82A thereof, and to similarly cause a beam emanating from the first optical fiber 80A and refracted across the air gap 79 to be propagated through the core 82B of the second optical fiber 80B in a direction aligned with the core 82B thereof. In certain embodiments, the first proximal end face 75A is angularly offset away from the second proximal end face 75B according to the angle Θ in a range of 3.35° to 4.7°, and the first bore 77A (and corresponding first optical fiber 80A) is angularly offset 1.0° to 1.5° away from the first longitudinal axis 71A, assuming that the second (HC) optical fiber has a MFD in a range of 25 µm to 35 µm. Reflective losses may be reduced by addition of one or more antireflection layers (e.g., 99' as shown in FIGS. 15A-15B) over the proximal end face 95A and corresponding end of the MFD transition region 85 of the first ferrule 72A. Although the ferrules 72A-72B are illustrated as being of relatively short length (between distal ends 76A, 76B and proximal ends 75A, 75B thereof), it is to be appreciated that such ferrules 72A-72B may be elongated significantly to accommodate their use in fiber optic connectors.

The above-referenced angular offsets for optical fiber end faces and ferrule bores accommodate HC optical fibers with MFD values larger than 25 µm for return loss values lower than −65 dB. If the MFD of a HC optical fiber is 35 µm, in certain embodiments a ferrule end face angle can be angularly offset 3.35° from perpendicular to a ferrule bore, with the ferrule bore being angularly offset from a longitudinal axis by 1.07°. In all the cases, the mode emanating from the first proximal end face 75A is highly collinear with the mode emanating from the second proximal end face 75B. The required angular alignment precision depends on the mode field diameter of the second (HC) optical fiber 80B. For example, to reduce the insertion loss from angular misalignment to less than 0.05 dB, the angular alignment tolerance is less than ±0.2° for a second (HC) optical fiber 80B having a MFD value of 25 µm, and such tolerance is tightened to ±0.2° for a second (HC) optical fiber 80B having a MFD value of 35 µm.

In an alternative embodiment, the first ferrule 72A (incorporating the SC optical fiber 80A and MFD transition region 85) may be provided with a first bore 77A that is parallel to (e.g., coaxial with) the first longitudinal axis 71A and the first proximal end face 75A may be angularly offset 2.2° to 3.2° away from perpendicular to the first bore 77A, while the second ferrule 72B (incorporating the HC optical fiber 80B) may be provided with a proximal end face 75B that is perpendicular to the second longitudinal axis 71B but the second bore 77B (and the second optical fiber 80*b*) may be non-parallel to the second longitudinal axis 71B with an angular offset of 1.0° to 1.5°.

FIG. 15A is a cross-sectional schematic view, and FIG. 15B illustrates a magnified end portion, of a fiber optic ferrule 92 having a bore 97 that is non-parallel with a longitudinal axis 91 of the ferrule 92. The ferrule 92 has a main body 93 (which may be cylindrical in shape) that terminates at a distal end face 96, and a has a frustoconical portion 84 that terminates at a proximal end face 95, with the bore 97 extending between the respective end faces 95, 96. A SC optical fiber 100 extends through the distal end face 96 and through the bore 97 to the proximal end face 95, with a MFD transition region 95 proximate to the proximal end face 95, such that a MFD of the optical fiber 100 is greater at the proximal end face 95 than at the distal end face 96. The optical fiber 100 includes a core 102 surrounded by cladding 104, and extends beyond the distal end face 96. The proximal end face 95 is oriented non-perpendicular to the longitudinal axis 91. One line $L_{PERPENDICULAR}$ is perpendicular to the longitudinal axis 91, while another line $L_{END\ FACE}$ is parallel to the end face 95, and a nonzero angle Θ is defined between $L_{PERPENDICULAR}$ and line $L_{END\ FACE}$. At least one antireflection material layer 99' is arranged over the proximal end face 95 including an end of the MFC transition region 95 of the optical fiber 100. The fiber optic ferrule 92 may be used as part of a fiber optic coupling assembly to promote low-loss coupling between SC optical fibers and HC optical fibers according to various embodiments disclosed herein.

In certain embodiments, a first ferrule may incorporate a SC optical fiber (including a MFD transition region) arranged parallel to a first longitudinal axis thereof with a first ferrule end face being perpendicular the first longitudinal axis, and a second ferrule may incorporate a HC optical fiber arranged non-parallel to a second longitudinal axis thereof with a second ferrule end face being non-perpendicular to the first longitudinal axis.

Figure 16:
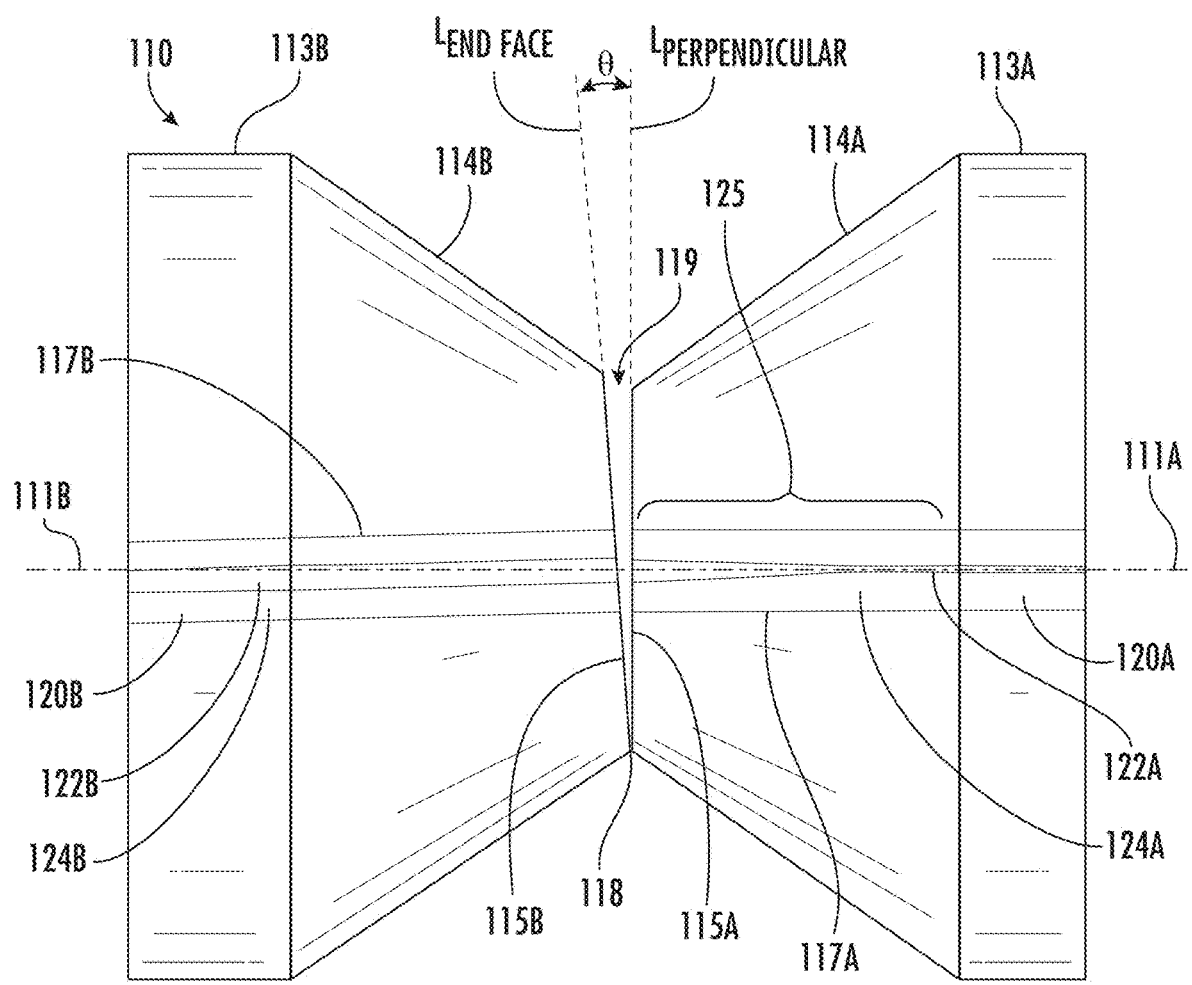
FIG. 16 is a cross-sectional schematic view of two fiber optic ferrules having non-parallel end faces contacting one another along limited portions of the end faces, with an air gap between remaining portions of the end faces, with one ferrule bore containing a hollow core optical fiber, and with the other ferrule bore containing a solid core optical fiber with a mode field diameter transition region.

FIG. 16 is a cross-sectional schematic view of a fiber optic coupling assembly 110 for coupling a first (SC) optical fiber 120A (having a MFD transition region 115) contained in a first bore 117A of a first fiber optic ferrule 113A with a second (HC) optical fiber 120B contained in a second bore 117B of a second optic ferrule 113B, wherein proximal end faces 115A, 115B of the respective fiber optic ferrules 113A, 113B are non-parallel to one another. A contact region 118 is provided along limited or small portions of the proximal end faces 115A, 115B, while an air gap 119 is provided between remaining portions of the proximal end faces 115A, 115B. Each ferrule 113A, 113B includes a frustoconical portion 114A, 114B proximate to the corresponding proximal end face 115A, 115B. The first optical fiber 120A has a solid core 122A surrounded by cladding 124A, wherein a MFD of the first optical fiber 120A is increased at the MFD transition region 125 proximate to the first proximal end face 115A, which is perpendicular to a first longitudinal axis 111A of the first ferrule 113A. The second (HC) optical fiber 120B has a hollow core 122B surrounded by cladding 124B, wherein a MFD of the hollow core 122B is constant throughout the length of the second optical fiber 120B. One line $L_{PERPENDICULAR}$ is perpendicular to the first longitudinal axis 110A and is parallel to the first end face 115A, while another line $L_{END\ FACE}$ is parallel to the second end face 115B, and a nonzero angle Θ is defined between $L_{PERPENDICULAR}$ and line $L_{END\ FACE}$. In certain embodiments, the second proximal end face 115B is angularly offset from perpendicular (e.g., with Θ being in a range of 2.2° to 3.2°) relative to the second longitudinal axis 111B. In certain embodiments, the second bore 117B and the second (HC) optical fiber 120B are angularly offset 1.0° to 1.5° from the second longitudinal axis 110B.

In certain embodiments, an air gap between proximal end faces of mating ferrules of a fiber optic coupling assembly can be eliminated by polishing the ferrule end face terminating a HC optical fiber to the same angle as the ferrule end face terminating the LC optical fiber, with both ferrule end faces being non-perpendicular to longitudinal axes thereof, wherein connectors bearing these ferrules may be mated in a manner similar to conventional angle-polished physical contact fiber optic connectors. Because of the air core of HC optical fiber, the mode emanating from the HC optical fiber is unchanged in direction even when the HC optical fiber and ferrule end face are shaped at an angle. When both a HC optical fiber and a SC optical fiber are contained in ferrules having parallel end faces, physical contact between the ferrules can be obtained with the air core of the HC being sealed by the contacting ferrule end faces (i.e., without requiring the use of adhesives). In such an embodiment, the same spring force and end face geometry requirements utilized with conventional angled solid core optical fiber connectors can be employed.

Figure 17:
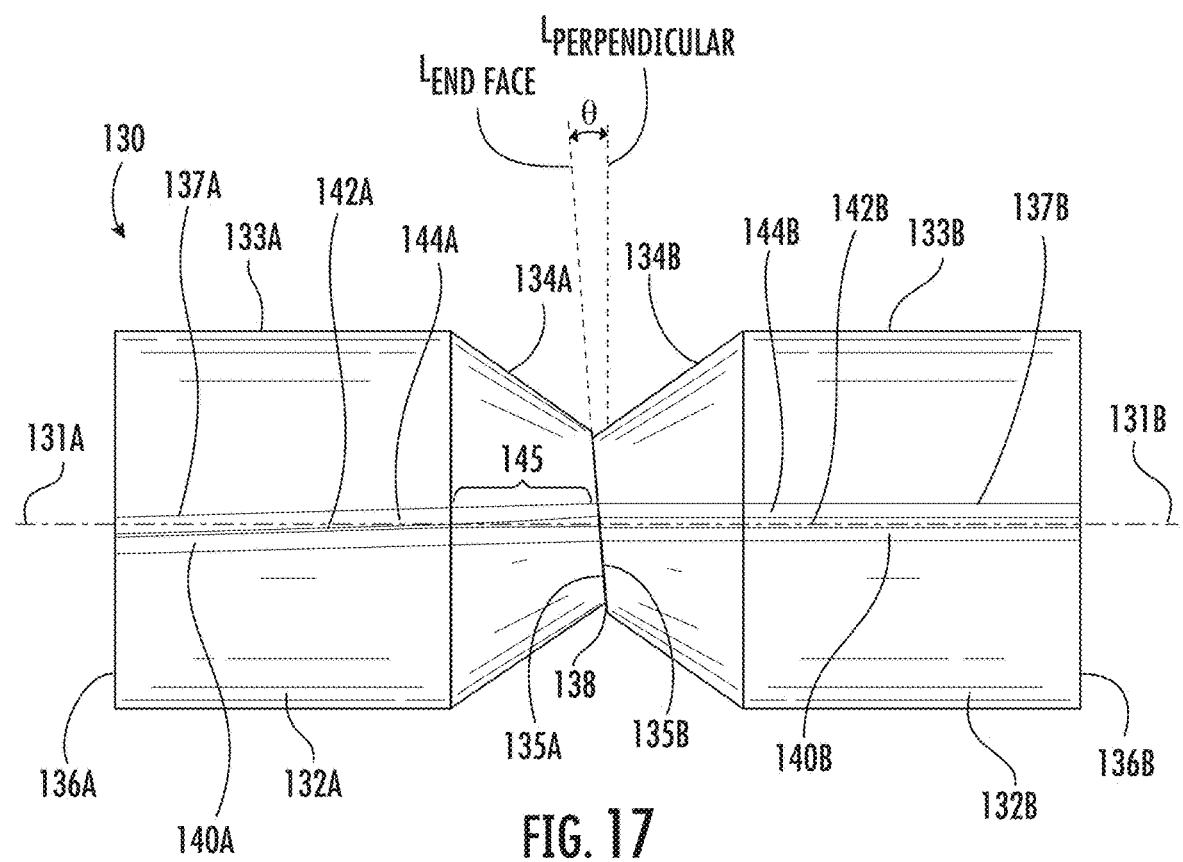
FIG. 17 is a cross-sectional schematic view of two fiber optic ferrules having parallel end faces that are non-perpendicular to longitudinal axes of the ferrules and that are contacting one another along substantial entireties of the end faces, with one ferrule bore containing a solid core optical fiber with a mode field diameter transition region, and with the other ferrule bore containing a hollow core optical fiber.

FIG. 17 is a cross-sectional schematic view of a fiber optic coupling assembly 130 for coupling a SC optical fiber 140A contained in a first bore 137A of a first fiber optic ferrule 136A with a HC optical fiber 140B contained in a second bore 137B of a second optic ferrule 136B, wherein proximal end faces 135A, 135B of the respective fiber optic ferrules 136A, 136B are parallel to, and in contact with, one another. Each ferrule 132A, 132B includes a main body 133A, 133B (which may be cylindrical in shape) terminating at a distal end face 136A, 136B, includes a frustoconical portion 134A, 134B terminating at the proximal end face 135A, 135B, and includes a longitudinal axis 131A, 131B that is centered with respect to the main body 133A, 133B. The first optical fiber 140A has a solid core 142A surrounded by cladding 144A, and includes a MFD transition region 145 proximate to the proximal end face 135A of the first ferrule 132. A MFD of the first optical fiber 140A is larger at the proximal end face 135A than at the distal end face 136A. As shown, the first bore 137A is non-parallel to a first longitudinal axis 131A of the first ferrule 132A, and the first proximal end face 135A is non-perpendicular to the first longitudinal axis 131A. The second optical fiber 140B is a HC optical fiber having a hollow core 142B surrounded by cladding 144B, with a constant MFD. As shown, the second bore 137B defined in the second ferrule 132B is parallel to a second longitudinal axis 131B of the second ferrule 132B, and the second proximal end face 135B is perpendicular to the second longitudinal axis 131B. One line $L_{PERPENDICULAR}$ is perpendicular to the first and second longitudinal axes 131A, 131B, while another line $L_{END\ FACE}$ is parallel to both the first and second end faces 135A, 135B (which are in contact with one another), and a nonzero angle Θ is defined between $L_{PERPENDICULAR}$ and line $L_{END\ FACE}$. In use, a mode emitted by the hollow core 142B of the second (HC) optical fiber 140B is transmitted at the interface 138 into the MFD transition region 135 of the first (SC) optical fiber 140A, and is conveyed to the core 142A of the first optical fiber 140A having a smaller MFD proximate to the distal end 136A of the first ferrule 132A. Because the proximal end faces 135A, 135B are in contact, the hollow core 142B is sealed against intrusion from water, particulate material, etc.

In certain embodiments, an end of a hollow core optical fiber may be inset relative to a proximal end face of a ferrule, such that a tip of the hollow core optical fiber is not flush with the proximal end face, and an undercut is provided. The undercut is much smaller than the Rayleigh length of the mode field, so that the insertion loss across the gap is negligible. In certain embodiments, the undercut can be less than 50 μm, or less than 25 μm, in depth.

Figure 18A:
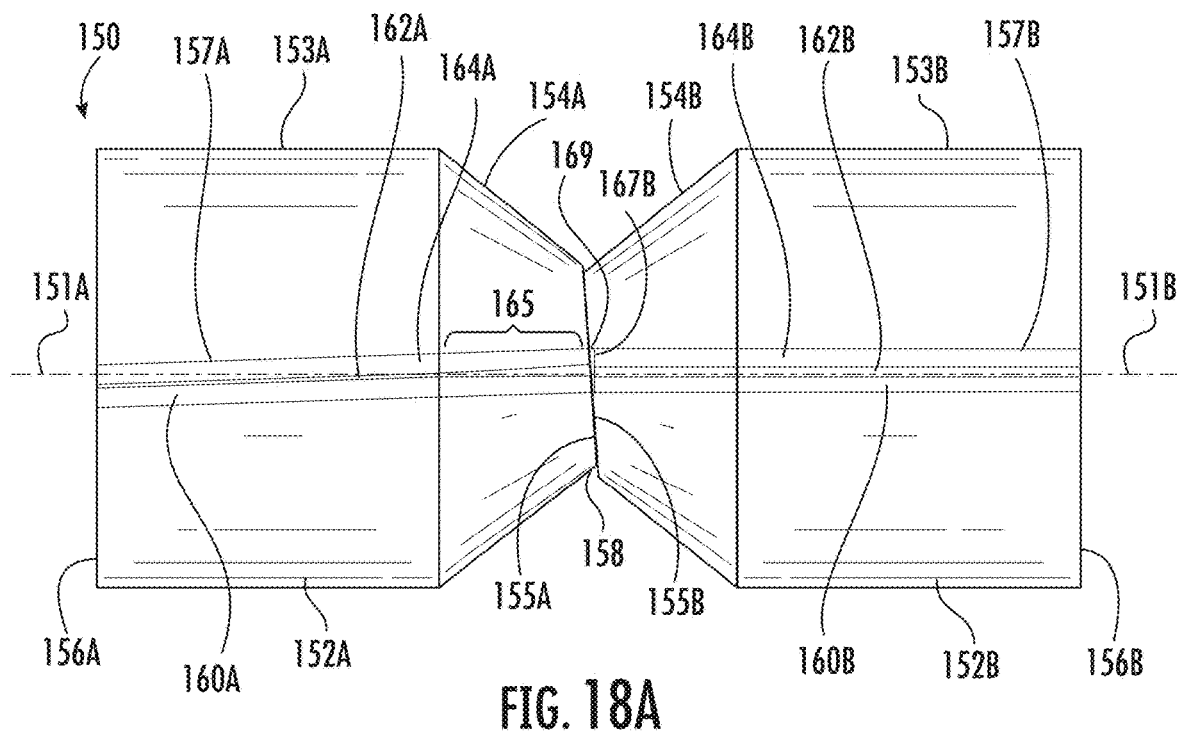
FIG. 18A is a cross-sectional schematic view of two fiber optic ferrules having parallel end faces that are non-perpendicular to longitudinal axes of the ferrules and that are contacting one another along substantial entireties of the end faces, with one ferrule bore containing a solid core optical fiber with a mode field diameter transition region, and with the other ferrule bore containing a hollow core optical fiber with an inset region wherein a tip of the hollow core optical fiber is not flush with the corresponding ferrule end face.
Figure 18B:
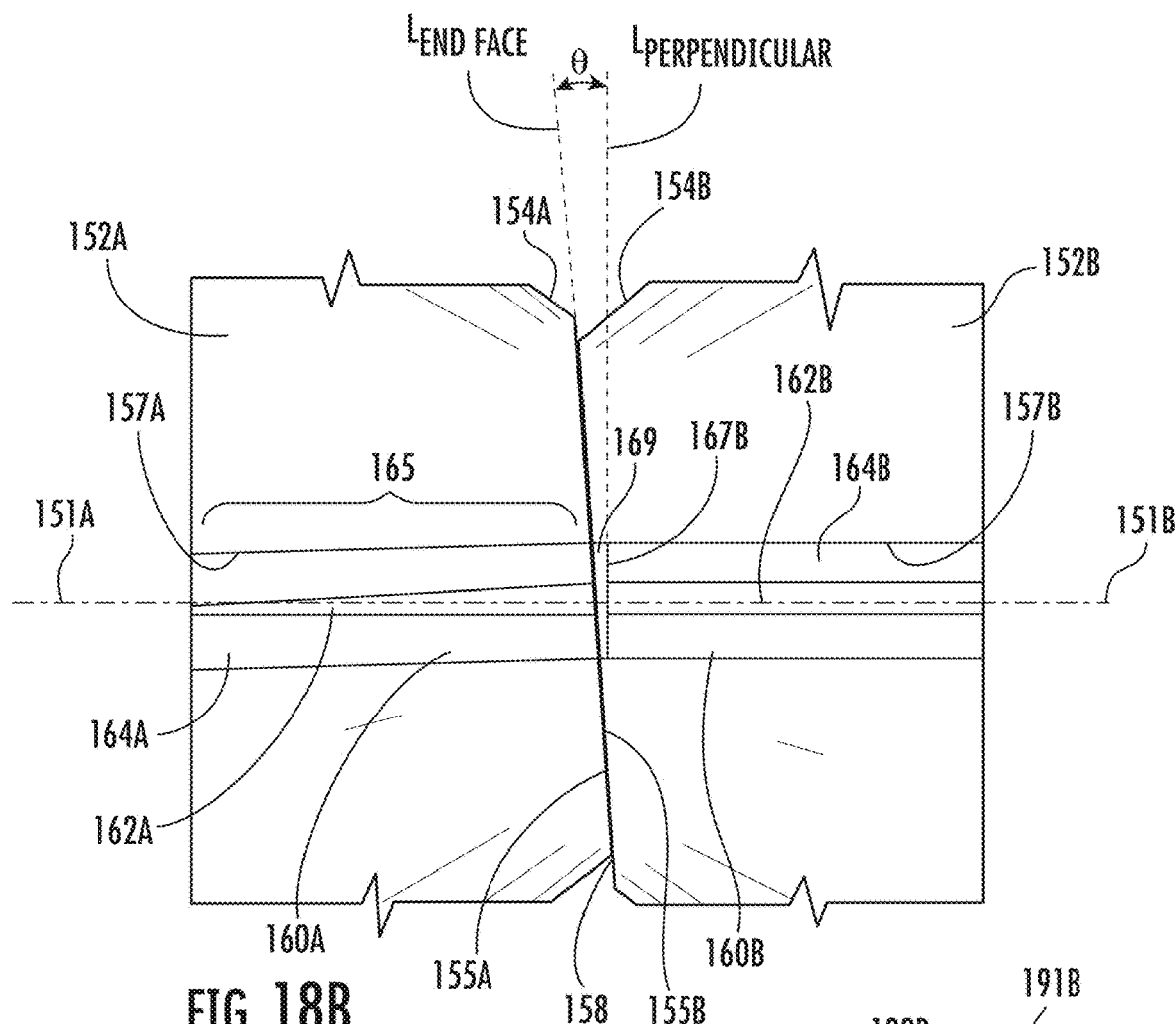
FIG. 18B is a magnified view of a portion of FIG. 18A, showing the ferrule end faces, mode field diameter transition region, and inset region proximate to the tip of the hollow core optical fiber.

FIG. 18A is a cross-sectional schematic view, and FIG. 18B illustrates a magnified central portion of, a fiber optic coupling assembly 150 for coupling a SC optical fiber 160A contained in a first bore 157A of a first fiber optic ferrule 156A with a HC optical fiber 160B contained in a second bore 157B of a second optic ferrule 156B. Each ferrule 152A, 152B includes a main body 153A, 153B (which may be cylindrical in shape), a frustoconical portion 154A, 154B terminating at the proximal end face 155A, 155B, and a longitudinal axis 151A, 151B that is centered with respect to the main body 153A, 153B. The first optical fiber 160A has a solid core 162A surrounded by cladding 164A, and includes a MFD transition region 165 proximate to the proximal end face 155A of the first ferrule 152. As shown, the first bore 157A is non-parallel to a first longitudinal axis 151A of the first ferrule 152A, and the first proximal end face 155A is non-perpendicular to the first longitudinal axis 151A. The second optical fiber 160B is a HC optical fiber having a hollow core 162B surrounded by cladding 164B, with a constant MFD. A proximal end 167B of the second optical fiber 160B is not flush with the second proximal end face 155B of the second ferrule 152B, such that an undercut or inset region 169 is provided between the proximal end 167B of the second optical fiber 160B and the second proximal end face 155B. One line $L_{PERPENDICULAR}$ is perpendicular to the first and second longitudinal axes 151A, 151B and is parallel to the proximal end 167B of the second optical fiber 160B, while another line $L_{END\ FACE}$ is parallel to both the first and second end faces 155A, 155B (which are in contact with one another), and a nonzero angle Θ is defined between $L_{PERPENDICULAR}$ and line $L_{END\ FACE}$. In use, a mode emitted by the hollow core 162B of the second (HC) optical fiber 140B is transmitted across the undercut or inset region 169 and the interface 158 into the MFD transition region 155 of the first (SC) optical fiber 160A, and is conveyed to the core 162A of the first optical fiber 160A having a smaller MFD outside the MFD transition region 155. Because the proximal end faces 155A, 155B are in contact, the hollow core 162B is sealed against intrusion from water, particulate material, etc.

In certain embodiments, ferrules disclosed herein (including ferrules having bores non-parallel to longitudinal axes thereof) may be fabricated with an injection molding process, from ceramic and/or polymeric materials. Although various exemplary embodiments described herein relate to ferrules having single bores, it is to be appreciated that the present disclosure is not limited to single-fiber connectors. Rather, the present disclosure further encompasses multi-fiber ferrules and multi-fiber coupling assemblies, including (but not limited to) multi-fiber push on (MPO) connectors. In certain embodiments, a MPO ferrule including bores (also known as microholes) that are non-parallel to a longitudinal axis of the ferrule may be produced by injection molding, such that one ferrule including an array of SC optical fibers may be connected to another ferrule including an array of HC optical fibers. Ferrules according to various embodiments can be assembled into standard connector housings, such as SC or LC connector housing for single-fiber connectors, and MPO connector housing for multi-fiber connectors. In certain embodiments in which little to no physical contact is required between mating ends of ferrules, the spring force of the corresponding connectors can be considerably reduced from the standard forces (e.g., 10 N or the like).

Figure 19:
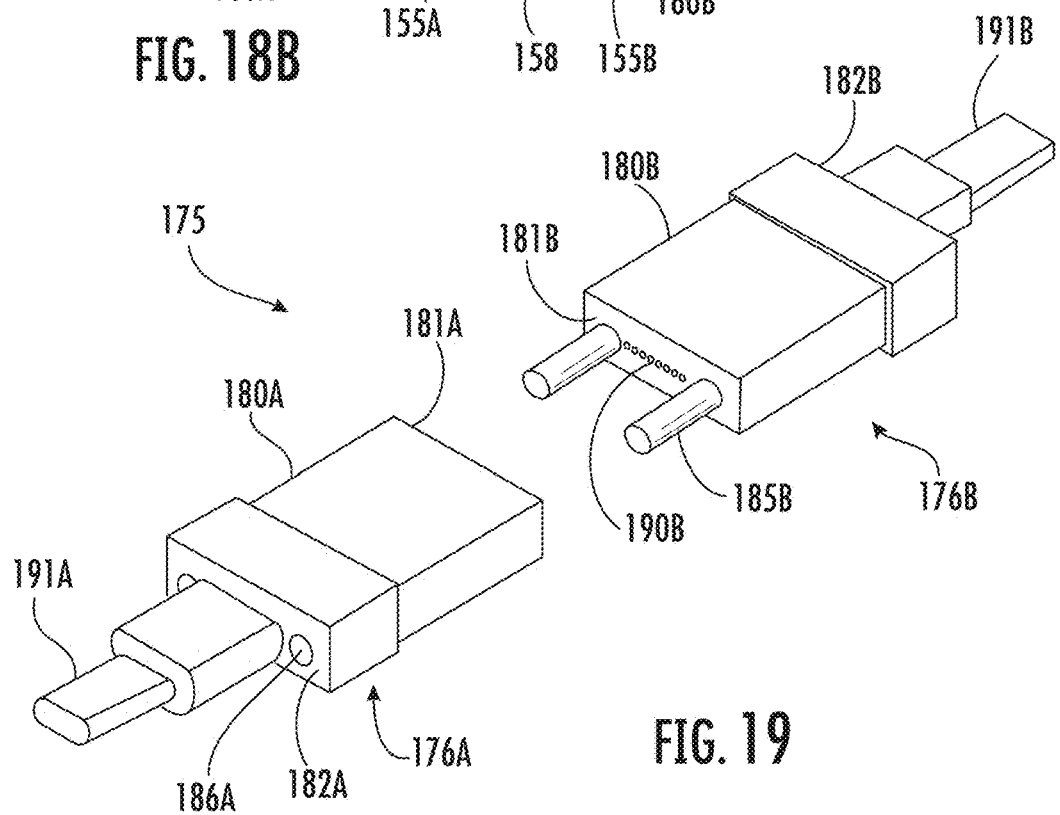
FIG. 19 is a perspective schematic assembly view of two multi-fiber push-on (MPO) connectors including multi-fiber ferrules for making optical connections between multiple optical fibers.

FIG. 19 is a perspective schematic assembly view of a fiber optic coupling assembly 175 including first and second multi-fiber push-on (MPO) connectors 176A, 176B each including a multi-fiber ferrule 180A, 180B for making optical connections between arrays of optical fibers, wherein a first ferrule 180A may include an array of SC optical fibers (including at least first and second SC optical fibers) emanating from a first ribbon 191A, and a second ferrule 180B may include an array of FTC optical fibers 190B (including at least first and second HC optical fibers) emanating from a second ribbon 191B. Each SC optical fiber includes a MFD transition region within the multi-fiber ferrule 180A. Each array may include any suitable number of optical fibers (e.g., 2, 4, 8, 16, 24, etc.) arranged in a single row or in multiple rows. Each ferrule 180A, 180B defines an array of bores extending from a proximal end face 181A, 181B to a distal end face 182A, 182B thereof. The second ferrule 176B includes protruding alignment pins 185B that are configured to be received by alignment holes 186A defined in the first ferrule 176A. As will be recognized by those skilled in the art upon review of the present disclosure, any one or more features for ferrules and coupling assemblies described hereinabove may be integrated into the multi-fiber ferrules 180A, 180B and fiber optic coupling assembly 175.

Those skilled in the art will appreciate that other modifications and variations can be made without departing from the spirit or scope of the invention. Since modifications, combinations, sub-combinations, and variations of the disclosed embodiments incorporating the spirit and substance of the invention may occur to persons skilled in the art, the invention should be construed to include everything within the scope of the appended claims and their equivalents. The claims as set forth below are incorporated into and constitute part of this detailed description.

What is claimed is:

1. A fiber optic coupling assembly comprising:
   a first fiber optic ferrule comprising a first body structure having a first longitudinal axis, a first proximal end face, and a first distal end face, the first body structure defining a first bore extending from the first proximal end face to the first distal end face; and
   a second fiber optic ferrule comprising a first body structure having a second longitudinal axis, a second proximal end face, and a second distal end face, the second body structure defining a second bore extending from the second proximal end face to the second distal end face;
   wherein:
      the second longitudinal axis is coaxial with the first longitudinal axis;
      at least a portion of the first proximal end face is non-parallel to the second proximal end face;
      a first portion of the first proximal end face is in contact with a first portion of the second proximal end face, and an air gap is provided between a second portion of the first proximal end face and a second portion of the second proximal end face;
      at least one of the first proximal end face or the second proximal end face is non-perpendicular to each of the first longitudinal axis and the second longitudinal axis;
      the first bore contains a solid core optical fiber having a first mode field diameter at the first proximal end face, having a second mode field diameter at the first distal end face, and having a mode field diameter transition region arranged between the first proximal end face and the first distal end face, the mode field diameter transition region providing a mode field diameter that transitions from the first mode field diameter to the second mode field diameter; and
      the second bore contains a hollow core optical fiber.

2. The fiber optic coupling assembly of claim 1, further comprising an antireflection coating at the first proximal end face.

3. The fiber optic coupling assembly of claim 1, wherein the first mode field diameter exceeds the second mode field diameter by at least 10 μm.

4. The fiber optic coupling assembly of claim 1, wherein the first body structure has a generally cylindrical shape, and the second body structure has a generally cylindrical shape.

5. The fiber optic coupling assembly of claim 1, wherein the first body structure comprises a frustoconical portion proximate to the first proximal end face, and the second body structure comprises a frustoconical portion proximate to the second proximal end face.

6. The fiber optic coupling assembly of claim 1, wherein one of the first bore or the second bore is non-parallel with the first and second longitudinal axes, while the other of the first bore or the second bore is parallel with the first and second longitudinal axes.

7. The fiber optic coupling assembly of claim 6, wherein for the one of the first bore or the second bore that is non-parallel with the first and second longitudinal axes and the second longitudinal axis, an angular mismatch between the bore and the first and second longitudinal axes is in a range of 1.0 degrees to 1.5 degrees.

8. The fiber optic coupling assembly of claim 6, wherein a center of the first bore is coincident with the first longitudinal axis at the first proximal end face, and a center of the second bore is coincident with the second longitudinal axis at the second proximal end face.

9. The fiber optic coupling assembly of claim 1, wherein a proximal end of the hollow core optical fiber is non-parallel with the second proximal end face, an inset region is provided between the second end face and the proximal end of the hollow core optical fiber, and an air gap is provided between a portion of the proximal end of the hollow core optical fiber and portion of a proximal end of the solid core optical fiber.

10. The fiber optic coupling assembly of claim 1, wherein:
the first fiber optic ferrule comprises a plurality of first bores extending from the first proximal end face to the first distal end face;
the second fiber optic ferrule comprises a plurality of second bores extending from the second proximal end face to the second distal end face;
each first bore of the plurality of first bores contains a solid core optical fiber having a first mode field diameter at the first proximal end face, having a second mode field diameter at the first distal end face, and having a mode field diameter transition region arranged between the first proximal end face and the first distal end face, the mode field diameter transition region providing a mode field diameter that transitions from the first mode field diameter to the second mode field diameter; and
each second bore of the plurality of second bores contains a hollow core optical fiber.

11. The fiber optic coupling assembly of claim 1, comprising a first connector that comprises the first fiber optic ferrule, and comprising a second connector that comprises the second fiber optic ferrule.

12. The fiber optic coupling assembly of claim 1, wherein the first proximal end face is angularly offset away from the second proximal end face by to an angle in a range of from 3.35° to 4.7°.

* * * * *